US011991800B2

(12) United States Patent
Harte et al.

(10) Patent No.: US 11,991,800 B2
(45) Date of Patent: May 21, 2024

(54) CONTROLLABLE LIGHTING DEVICE

(71) Applicant: Lutron Technology Company LLC, Coopersburg, PA (US)

(72) Inventors: Matthew V. Harte, Stewartsville, NJ (US); Sharath R. Naik, Bethlehem, PA (US); Alexander S. Petersen, Bethlehem, PA (US); Ryan M. Spicer, Perkasie, PA (US); Mark S. Taipale, Harleysville, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/111,733

(22) Filed: Feb. 20, 2023

(65) Prior Publication Data

US 2023/0209673 A1 Jun. 29, 2023

Related U.S. Application Data

(63) Continuation of application No. 17/647,949, filed on Jan. 13, 2022, now Pat. No. 11,612,029.

(60) Provisional application No. 63/136,908, filed on Jan. 13, 2021.

(51) Int. Cl.

*H05B 45/20* (2020.01)
*F21K 9/238* (2016.01)
*H05B 45/10* (2020.01)
*F21Y 115/10* (2016.01)

(52) U.S. Cl.

CPC ............ *H05B 45/20* (2020.01); *F21K 9/238* (2016.08); *H05B 45/10* (2020.01); *F21Y 2115/10* (2016.08)

(58) Field of Classification Search

CPC ........ H05B 45/10; H05B 45/20; H05B 45/14; H05B 45/18; H05B 45/24; H05B 45/28; H05B 45/30; H05B 47/19; F21K 9/238; F21Y 215/10

See application file for complete search history.

(56) References Cited

U.S. PATENT DOCUMENTS

| | | | |
|---|---|---|---|
| 9,332,598 | B1 | 5/2016 | Ho et al. |
| 9,392,660 | B2 | 7/2016 | Dias et al. |
| 9,392,663 | B2 | 7/2016 | Knapp et al. |
| 9,485,813 | B1 | 11/2016 | Lewis et al. |
| 9,538,623 | B2 | 1/2017 | Lee et al. |

(Continued)

FOREIGN PATENT DOCUMENTS

WO 2020152068 A1 7/2020

*Primary Examiner* — Haissa Philogene
(74) *Attorney, Agent, or Firm* — Flaster Greenberg, P.C.

(57) ABSTRACT

A lighting device may include a light source, a plurality of drive circuits, and a control circuit. The light source may include a plurality of emitter circuits that are configured to emit light. The light source may include a first emitter circuit that is configured to emit light at a first color (e.g., color temperature), a second emitter circuit is configured to emit light at a second color (e.g., color temperature), and a third emitter circuit is configured to emit light at a third color (e.g., color temperature). The first, second, and third colors (e.g., color temperatures) may be on a color curve, such as a color temperature curve like the black body locus. The control circuit may be configured to control the amount of power delivered to no more than two emitter circuits to emit light when controlling the light emitted by the light source to the target intensity.

24 Claims, 12 Drawing Sheets

(56) References Cited

U.S. PATENT DOCUMENTS

| | | | | |
|---|---|---|---|---|
| 9,736,895 | B1 | 8/2017 | Dong et al. | |
| 9,769,899 | B2 | 9/2017 | Ho et al. | |
| 10,076,011 | B1 * | 9/2018 | Amidi | H05B 47/10 |
| 10,098,197 | B2 | 10/2018 | Van De Ven et al. | |
| 10,125,960 | B2 | 11/2018 | Klafta et al. | |
| 10,161,786 | B2 | 12/2018 | Chang et al. | |
| 10,299,321 | B1 | 5/2019 | Trask et al. | |
| 10,904,976 | B2 | 1/2021 | DeJonge et al. | |
| 11,333,343 | B2 | 5/2022 | Bocock et al. | |
| 11,357,084 | B2 | 6/2022 | DeJonge | |
| 11,612,029 | B2 * | 3/2023 | Harte | H05B 45/24 |
| 2006/0170376 | A1 * | 8/2006 | Piepgras | H05B 47/105 315/295 |
| 2010/0103678 | A1 | 4/2010 | Van De Ven et al. | |
| 2010/0315012 | A1 | 12/2010 | Kim et al. | |
| 2013/0147359 | A1 | 6/2013 | Chobot | |
| 2015/0103515 | A1 | 4/2015 | Bosua et al. | |
| 2015/0282260 | A1 | 10/2015 | Hussell et al. | |
| 2015/0285441 | A1 | 10/2015 | Chou et al. | |
| 2016/0205752 | A1 | 7/2016 | Chung | |
| 2016/0323972 | A1 * | 11/2016 | Bora | H05B 47/11 |
| 2017/0086274 | A1 | 3/2017 | Soler et al. | |
| 2017/0162547 | A1 | 6/2017 | Bergmann et al. | |
| 2019/0337449 | A1 | 11/2019 | Diana et al. | |
| 2020/0314974 | A1 * | 10/2020 | Thurk | H05B 45/3577 |
| 2021/0298151 | A1 * | 9/2021 | Kotal | H05B 45/46 |
| 2022/0026052 | A1 | 1/2022 | Keller et al. | |

* cited by examiner

CONTROLLABLE LIGHTING DEVICE

CROSS-REFERENCE TO RELATED APPLICATIONS

This application is a continuation of Non-Provisional patent application Ser. No. 17/647,949, filed Jan. 13, 2022, which claims priority from Provisional U.S. Patent Application No. 63/136,908, filed Jan. 13, 2021, the entire disclosures of which are hereby incorporated by reference herein in their entirety.

BACKGROUND

Lamps and displays using efficient light sources, such as light-emitting diodes (LED) light sources, for illumination are becoming increasingly popular in many different markets. LED light sources provide a number of advantages over traditional light sources, such as incandescent and fluorescent lamps. For example, LED light sources may have a lower power consumption and a longer lifetime than traditional light sources. In addition, the LED light sources may have no hazardous materials, and may provide additional specific advantages for different applications. When used for general illumination, LED light sources provide the opportunity to adjust the color (e.g., from white, to blue, to green, etc.) or the color temperature (e.g., from warm white to cool white) of the light emitted from the LED light sources to produce different lighting effects.

A multi-colored LED illumination device may have two or more different colors of LED emission devices (e.g., LED emitters) that are combined within the same package to produce light (e.g., white or near-white light). There are many different types of white light LED light sources on the market, some of which combine red, green, and blue (RGB) LED emitters; red, green, blue, and yellow (RGBY) LED emitters; phosphor-coated white and red (WR) LED emitters; red, green, blue, and white (RGBW) LED emitters, etc. By combining different colors of LED emitters within the same package, and driving the differently-colored emitters with different drive currents, these multi-colored LED illumination devices may generate white or near-white light within a wide gamut of color points or correlated color temperatures (CCTs) ranging from warm white (e.g., approximately 2600K-3700K), to neutral white (e.g., approximately 3700K-5000K) to cool white (e.g., approximately 5000K-8300K). Some multi-colored LED illumination devices also may enable the brightness (e.g., intensity or dimming level) and/or color of the illumination to be changed to a particular set point. These tunable illumination devices may all produce the same color and color rendering index (CRI) when set to a particular dimming level and chromaticity setting (e.g., color set point) on a standardized chromaticity diagram.

SUMMARY

A lighting device may include a light source, a plurality of drive circuits, and a control circuit. The light source may include a plurality of emitter circuits that are configured to emit light. For example, the light source may include a first emitter circuit that is configured to emit light at a first color (e.g., color temperature), a second emitter circuit is configured to emit light at a second color (e.g., color temperature), and a third emitter circuit is configured to emit light at a third color (e.g., color temperature). The first, second, and third colors (e.g., color temperatures) may be on a color path, such as a color temperature path like the black body locus. A color path may be connections of segments or points, and/or a curved line in the color space. The black body locus (i.e., the Planckian locus, or a black body curve) may be defined within an International Commission on Illumination (CIE) 1931 color space. In some examples, a color that is within one MacAdam ellipse of the black body locus is on the black body locus. The second color temperature may reside between the first color temperature and the third color temperature along the black body locus. Although described in context of the black body locus, the lighting device may be configured to control light along any path or plurality of connected segments (e.g., color segments), such as a piecewise one-dimensional color space or other electrical controllable characteristic of the emitter circuits.

The drive circuits may be configured to control the amount of power delivered to the plurality of emitter circuits. For example, the control circuit may be configured to control an amount of current delivered to the plurality of emitter circuits to control the light emitted by the light source. The control circuit may be configured to control the plurality of drive circuits to adjust a present intensity of the light emitted by the light source across a dimming range. The control circuit may be configured to control an amount of power delivered to the first and second emitter circuits (e.g., only to the first and second emitter circuits) to control the light emitted by the light source along a first segment of color temperatures between the first and second color temperatures, and control an amount of power delivered to second and third emitter circuits (e.g., only to the second and third emitter circuits) to control the light emitted by the light source along a second segment of color temperatures between the second and third color temperatures.

Alternatively or additionally, the control circuit may be configured to control an amount of power delivered to the first and second emitter circuits to turn on the first and second emitter circuits while keeping the third emitter circuit off to control the light emitted by the light source between the first and second color temperatures, and control an amount of power delivered to the second and third emitter circuits to turn on the second and third emitter circuits while keeping the first emitter circuit off to control the light emitted by the light source between the second and third color temperatures. Alternatively or additionally, the control circuit may be configured to control an amount of power delivered to the first and second emitter circuits to control the light emitted by the light source along a first intensity range, and control an amount of power delivered to the second and third emitter circuits to control the light emitted by the light source along a second intensity range, where the first and second intensity ranges do not overlap. Alternatively or additionally, the control circuit may be configured to control the amount of power delivered to no more than two emitter circuits to emit light when controlling the light emitted by the light source to the present intensity.

In some examples, each emitter circuit may include one or more light-emitting diodes (LEDs), and each LED of each emitter circuit may be configured to output light at the same color temperature. For instance, each emitter circuit may include one or more white phosphor-coated LEDs. For example, the first emitter circuit may include an equal or greater number of LEDs than the second emitter circuit, and the second emitter circuit comprises a greater number of LEDs than the third emitter circuit. Further, in some examples, the plurality of emitter circuits may include a fourth emitter circuit that is configured to emit light at a fourth color temperature that is on the black body locus. For instance, the first emitter circuit may be configured to emit light at a color temperature between 5,900 K and 5,500 K, the second emitter circuit may be configured to emit light at a color temperature between 3,200 K and 2,800 K, the third emitter circuit may be configured to emit light at a color temperature between 2,400 K and 2,000 K, and the fourth emitter circuit may be configured to emit light at a color temperature between 2,000 K and 1,600 K. Further, in some examples, the first emitter circuit may include eight LEDs, the second emitter circuit may include eight LEDs, the third emitter circuit may include five LEDs, and the fourth emitter circuit may include one LED.

For example, each emitter circuit may include one or more light-emitting diodes (LEDs) connected in a series electrical connection and/or a parallel electrical connection. In some instances, each LED of each emitter circuit is configured to output light at the same color temperature. In some examples, each emitter circuit may include one or more emitters that are mounted to a printed circuit board (PCB) and configured to be controlled by a drive circuit of the plurality of drive circuits in unison.

The lighting device may include a wireless communication circuit that is configured to communicate wireless control signals. In such examples, the control circuit may be configured to receive a target intensity or a target color temperature, and control the plurality of drive circuits to adjust the present intensity or color of the light emitted by the light source toward the target intensity or target color. The lighting device may include an antenna electrically coupled to the wireless communication circuit. The lighting device may include a power converter circuit that is configured to receive a source voltage (e.g., an alternating-current (AC) mains-line voltage) and generate a direct-current (DC) bus voltage. The lighting device may include a transparent or translucent dome, and the emitters may be configured to shine light through the dome. The lighting device may include a reflector that is configured to reflect light emitted by the emitters towards the lens. The lighting device may include a screw-in base that is configured to be screwed into a standard Edison socket for electrically coupling the lighting device to a power source.

One or more of the drive circuits of the lighting device may share a feedback circuit. For example, the lighting device may include a plurality of drive circuits, and each drive circuit may be electrically coupled to an emitter circuit of the plurality of emitter circuits. Each drive circuit may be configured to receive the DC bus voltage and control an amount of power delivered to the emitter circuit to control the intensity of the light emitted by the emitter circuit. The lighting device may include a plurality of feedback circuits. Each feedback circuit may be electrically coupled to two or more of the plurality of drive circuits and configured to generate a feedback signal for each drive circuit that is coupled to the feedback circuit. In some examples, the feedback signal may indicate a magnitude of the drive current conducted through the respective drive circuit. Further, in some examples, each of the plurality of feedback circuits is coupled to one or more of the drive circuits that are not configured to turn on the respective emitter circuits at the same time.

The control circuit may be configured to receive the feedback signals from the plurality of drive circuits, and control only one or more drive circuits that do not share a feedback circuit to adjust the magnitude of the drive current conducted through each drive circuit to towards a target current to control an intensity of light emitted by the lighting device. For example, the control circuit may be configured to adjust a present intensity of the light emitted by the light source by never controlling drive circuits that share a feedback circuit at the same time. For example, the control circuit may be configured to adjust a present intensity of the light emitted by the light source by never controlling drive circuits that share a feedback circuit to turn on the respective emitter circuits at the same time. For example, the control circuit may be configured to adjust a present intensity of the light emitted by the light source by never turning on drive circuits that share a feedback circuit at the same time. For example, the control circuit may be configured to adjust a present intensity of the light emitted by the light source by only controlling drive circuits that do not share a feedback circuit.

Each emitter circuit may be configured to emit light at a different color temperature along a black body locus. In such examples, a first feedback circuit may be configured to provide feedback for the drive circuits coupled to emitter circuits that emit light at non-sequential color temperatures of the different color temperatures along the black body locus (e.g., the first and third color temperatures, or the second and fourth color temperatures).

In some examples, the plurality of feedback circuits consists of (e.g., only consist of) a first feedback circuit and a second feedback circuit. The first feedback circuit may be electrically coupled to two or more drive circuits, and the second feedback circuit may be electrically coupled to one or more drive circuits, and the first and second feedback circuits are not coupled to the same drive circuit.

In some examples, each feedback circuit may be configured to receive a signal for each of the drive circuits coupled to the feedback circuit, and the signal may indicate a magnitude of the drive current conducted by the respective drive circuit.

In some examples, each feedback circuit may include a sense resistor that is shared by two or more drive circuits. The sense resistor may be configured to generate a sense voltage that is proportional to the magnitude of the current conducted through the drive circuit when the emitter circuit coupled to the drive circuit is turned on. Alternatively or additionally, each drive circuit may include a sense resistor that is configured to generate a sense voltage that is proportional to the magnitude of the current conducted through the drive circuit when the emitter circuit coupled to the drive circuit is turned on.

The plurality of emitter circuits may include four emitter circuits. The first emitter circuit may be configured to emit light at a first color temperature, the second emitter circuit at a second color temperature, the third emitter circuit at a third color temperature, and the fourth emitter circuit at a fourth color temperature. The first, second, third, and fourth color temperatures may be on the black body locus. The lighting device may also include a first feedback circuit that is electrically coupled to the first and third emitter circuits, and a second feedback circuit is electrically coupled to the second and fourth emitter circuits. In this example, the first color temperature may be greater than the second color temperature, the second color temperature may be greater than the third color temperature, and the third color temperature may be greater than the fourth color temperature.

The control circuit may be configured to control an amount of power delivered to first and second emitter circuits to control the light emitted by the light source along a first segment of color temperatures between the first and second color temperatures, control an amount of power delivered to second and third emitter circuits to control the light emitted by the light source along a second segment of color temperatures between the second and third color temperatures, and control an amount of power delivered to third and fourth emitter circuits to control the light emitted by the light source along a third segment of color temperatures between the third and fourth color temperatures.

The lighting device may include a screw in base that comprises the hot and neutral connections, wherein the power converter circuit is configured to receive an AC mains line voltage via the hot connection and the neutral connection.

In some examples, the lighting device may include a power converter circuit configured to receive a source voltage and generate a DC bus voltage, and a light source that includes three emitter circuits. The first emitter circuit may be configured to emit light at a first color temperature, the second emitter circuit may be configured to emit light at a second color temperature, and the third emitter circuit may be configured to emit light at a third color temperature, and the first, second, and third color temperatures may all be on the black body locus. The lighting device may include a first drive circuit electrically coupled to the first emitter circuit, a second drive circuit electrically coupled to the second emitter circuit, and a third drive circuit electrically coupled to the third emitter circuit. Each drive circuit may be configured to receive the DC bus voltage and control an amount of power delivered to their respective emitter circuit. The lighting device may also include two feedback circuits. The first feedback circuit may be electrically coupled to the first and third drive circuits, and configured to generate a first feedback signal that indicates a magnitude of the drive current conducted through the first drive circuit or the third drive circuit. The second feedback circuit may be electrically coupled to the second drive circuit, and configured to generate a second feedback signal that indicates a magnitude of the drive current conducted through the second drive circuit. The lighting device may also include a control circuit that is configured to receive the first and second feedback signals, and control only one of the first or third drive circuits at any given time to control an intensity of light emitted by the lighting device.

In some examples, the lighting device may include a fourth emitter circuit that is configured to emit light at a fourth color temperature, which is also on the black body locus, and include a fourth drive circuit electrically coupled to the fourth emitter circuit. The fourth drive circuit may be configured to receive the DC bus voltage and control an amount of power delivered to the fourth emitter circuit. In such examples, the second feedback circuit may be electrically coupled to the fourth drive circuit, and the second feedback signal may include a magnitude of the drive current conducted through the second drive circuit or the fourth drive circuit. And the control circuit may be configured to control only one of the second or fourth drive circuits at any given time to control the intensity of light emitted by the lighting device. In some instances, the first color temperature may be greater than the second color temperature, the second color temperature may be greater than the third color temperature, and the third color temperature may be greater than the fourth color temperature. Further, the control circuit may be configured to control an amount of power delivered to first and second emitter circuits to control the light emitted by the light source along a first segment of color temperatures between the first and second color temperatures, control an amount of power delivered to second and third emitter circuits to control the light emitted by the light source along a second segment of color temperatures between the second and third color temperatures, and control an amount of power delivered to third and fourth emitter circuits to control the light emitted by the light source along a third segment of color temperatures between the third and fourth color temperatures.

The lighting device may be configured to generate an offset (e.g., an offset voltage). In some examples, the feedback circuit may include an amplifier circuit that is configured to receive a sense signal indicative of a magnitude of the drive current conducted through the emitter circuit and output a feedback signal. The feedback circuit may be configured to add an offset to the sense signal prior to reception by the amplifier circuit. The offset may be configured to prevent the amplifier circuit from entering a saturated state when the emitter circuit is not emitting light. The control circuit may be configured to receive the feedback signal, determine an average magnitude of the drive current conducted through the drive circuit based on a magnitude of the feedback signal and the offset, and control the drive circuit to adjust the average magnitude of the drive current towards a target current in response to the average magnitude of the drive current. For example, the control circuit may be configured to determine the offset by averaging the feedback signal over time during instances when the emitter circuit is controlled to not emit light. For instance, the control circuit may be configured to subtract the offset from the feedback signal to determine the sense signal, and control an amount of power delivered to the emitter circuit based on the sense signal.

In some examples, the drive circuit may include a controllable switching circuit. When the controllable switching circuit is non-conductive, the feedback circuit may be configured to maintain the magnitude of the feedback signal at a value that indicates the average magnitude of the drive current during a period of time when the controllable switching circuit was previously conductive. In some examples, the lighting device may include two controllable switching circuits. In such examples, the control circuit may be configured to generate a drive signal for controlling the first controllable switching circuit of the drive circuit to adjust the average magnitude of the current conducted through the drive circuit, and generate a filter control signal to render the second controllable switching circuit of the feedback circuit conductive and non-conductive in coordination with the drive signal.

The feedback circuit may include a controllable switching circuit, and the control circuit may be configured to generate a filter control signal to render the controllable switching circuit of the feedback circuit conductive and non-conductive. For example, the control circuit may be configured to render the controllable switching circuit of the feedback circuit conductive during a filter time window. For instance, the control circuit may be configured to sample the feedback signal after a filter window time period, and subtract a correction factor from the feedback signal, where the correction factor represents the offset. The control circuit may be configured to sample the feedback signal using an analog-to-digital converter (ADC). Further, in some examples, the control circuit may be configured to determine the correction factor by rendering the controllable switching circuit of the feedback circuit conductive when the emitter circuit is turned off, measure the magnitude of the feedback signal, and store the measured magnitude of the feedback signal in memory as the correction factor.

DETAILED DESCRIPTION

Figure 1:
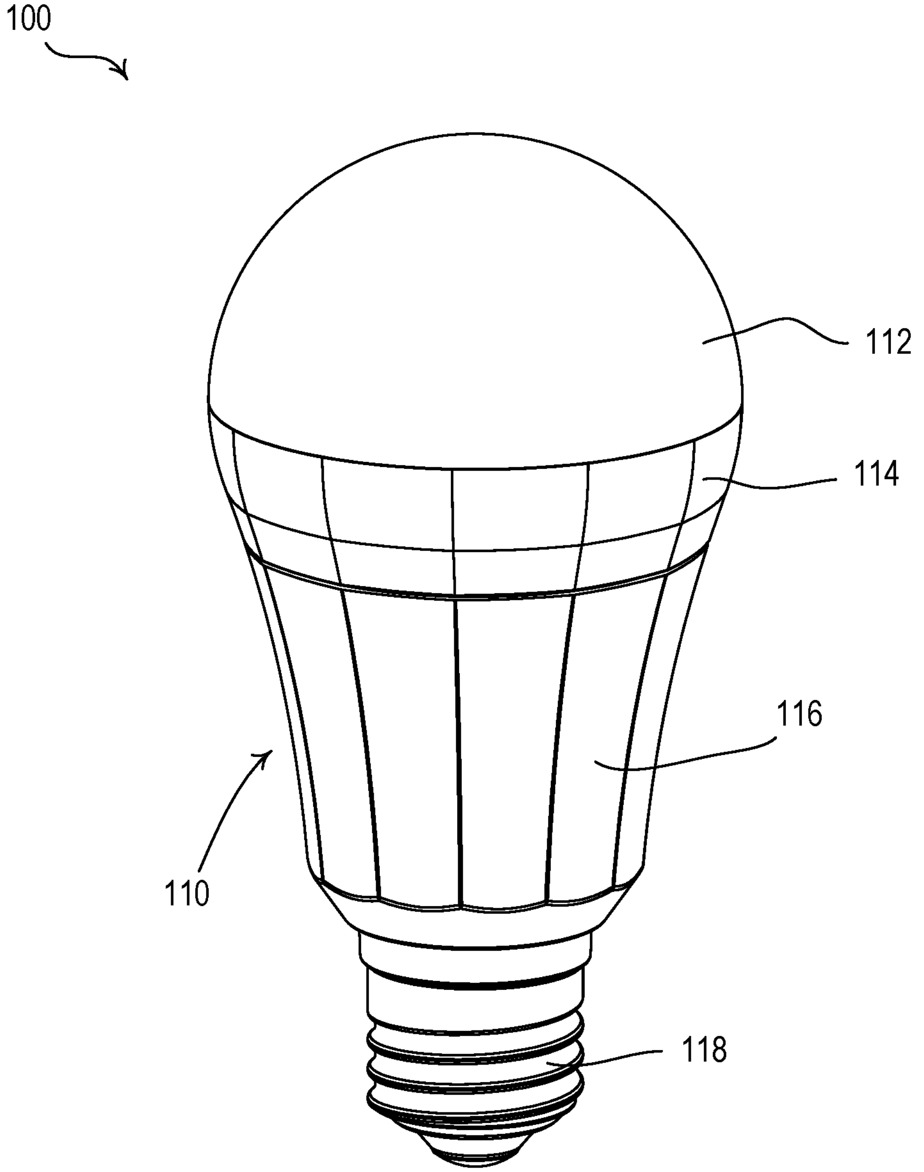
FIG. 1 is a perspective view of an example lighting device.

FIG. 1 is a perspective view of an example illumination device, such as a lighting device 100 (e.g., a controllable LED lighting device). The lighting device 100 may include a housing 110 having an upper dome 112 (e.g., a lens), a lower dome 114, and a housing heat sink 116. The upper dome 112 may be transparent or translucent and may be flat or domed, for example. For example, the lamp may comprise an A-type lamp. The lighting device 200 may be installed in a lighting fixture (e.g., such as a downlight fixture and/or a table or floor lamp), and may be replaceable and/or removeable. The lighting device 200 may also have the form factor of other replaceable and/or removeable lamp, such as a parabolic aluminized reflector (PAR) lamp. The lighting device 100 may include a base 118 (e.g., a screw-in base) that may be configured to be connected to (e.g., screwed into) a socket (e.g., a standard Edison socket) for electrically coupling the lighting device 100 to a power source, e.g., an alternating-current (AC) power source. The lighting device 100 may also have another type of base, such as a pin base, a twist-and-lock base, a bayonet base, or other suitable type of base. The lighting device 100 may have a different form factor, such as a linear form factor or other shape and/or size. The lighting device 100 may also be installed (e.g., permanently installed) in a lighting fixture, such as a downlight fixture, a linear lighting fixture, a strip lighting fixture, or other lighting fixture having one or more integral lighting devices (e.g., light engines).

Figure 2:
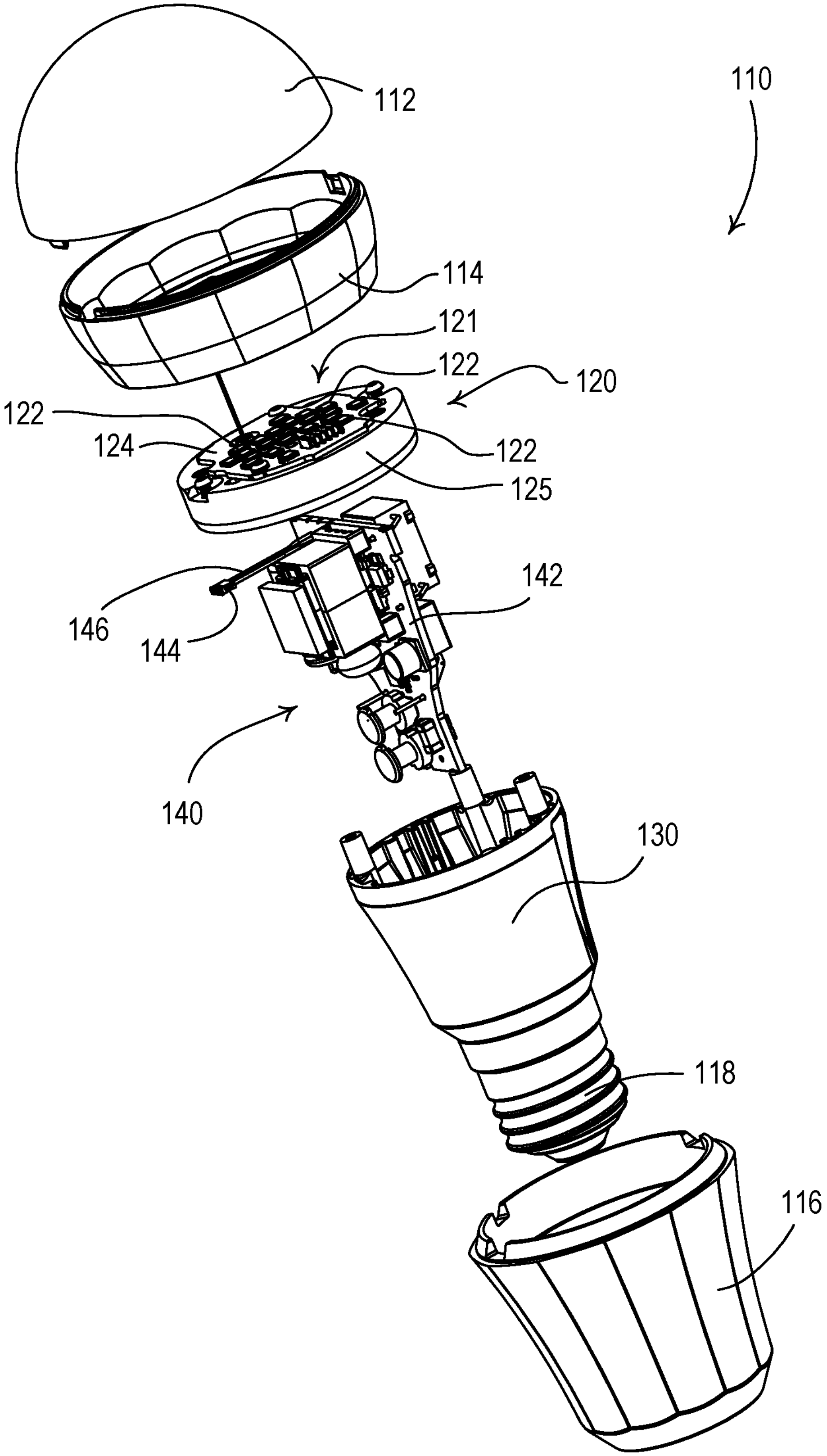
FIG. 2 is an exploded view of the lighting device of FIG. 1.

FIG. 2 is an exploded view of the lighting device 100. The lighting device 100 may comprise a light-generation module 120 that has a light source 121 (e.g., an internal light source). The light source 121 may include one or more emitters 122 (e.g., emission LEDs) mounted to an emitter printed circuit board (PCB) 124. The emitters 122 of the light-generation module 120 may be configured to shine light through the upper dome 112. As described in more detail below, the emitters 122 may be grouped together into groups of emitter circuits, where each emitter circuit comprises one or more emitters 122 that are electrically coupled in a series or parallel connection. Accordingly, the emitters 122 of an emitter circuit may be controlled to emit light in unison. Further, each emitter circuit may have a drive circuit, and may be individually controlled by the drive circuit and/or a control circuit of the lighting device 100. As also described in more detail below, each emitter 122 may be configured to emit light at nominal or rated color temperature, for example, as defined by ANSI C78.377-2011. In some examples, the emitters 122 of the light source 121 are all configured to emit light at a color temperature that is on a black body locus (e.g., within one MacAdam ellipse of the black body locus).

The light-generation module 120 may comprise a module heat sink 125 to which the emitters 122 of the emitter PCB 124 may be thermally coupled. The module heat sink 125 may be made from a thermally-conductive material (e.g., aluminum). The module heat sink 125 may have a circular periphery. The module heat sink 125 may have cylindrical shape and/or a truncated cone shape. The light-generation module 120 may be mounted (e.g., press fit) within the housing heat sink 116. The module heat sink 125 of the light-generation module 120 may be thermally coupled to the housing heat sink 116. The module heat sink 125 may transfer heat to the housing heat sink 116 peripherally. The housing heat sink 116 may be made from a material that is cheaper, but less thermally conductive than the material of the module heat sink 125. The housing heat sink 116 may be larger in volume and may have more surface area than the module heat sink 125.

The lighting device 100 may comprise an inner sleeve 130 that is connected to the screw-in base 118. The lighting device 100 may further comprise a power converter circuit 140 mounted to a power printed circuit board (PCB) 142. The power converter circuit 140 may be enclosed by the inner sleeve 130 of the lighting device 100. The power converter circuit 140 may be electrically connected to the screw-in base 118, such that the power converter circuit 140 may be configured to receive an AC mains line voltage generated by the AC power source. The power converter circuit 140 may comprise a bus connector 144 that may be electrically connected to the power PCB 142 via electrical wires 146 and may provide for an electrical connection to the light-generation module 120. The power converter circuit 140 may be configured to convert the AC mains line voltage received from the AC power source into a direct-current (DC) bus voltage for powering the light-generation module 120. The power converter circuit 140 may comprise a rectifier circuit (e.g., a full-wave bridge rectifier) for converting the AC mains line voltage to a rectified voltage. The power PCB 140 may be arranged in a plane that is perpendicular to a plane of the emitter PCB 124 of the light-generation module 120.

Figure 3:
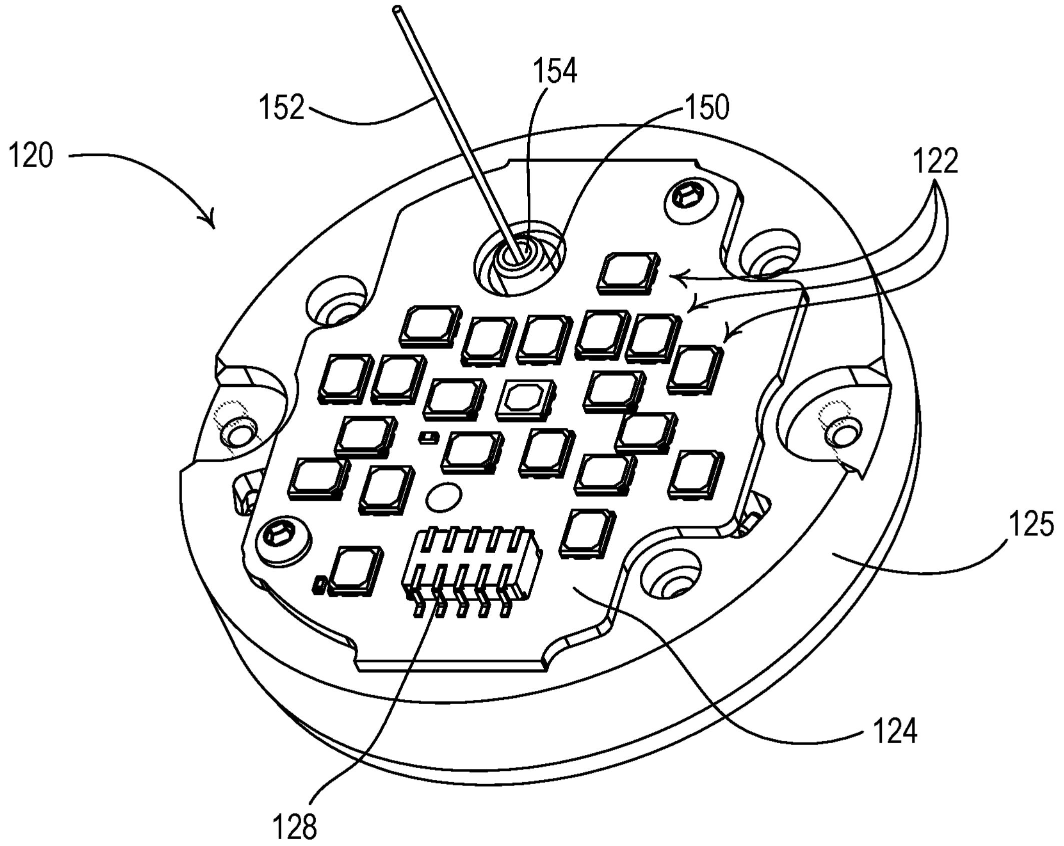
FIG. 3 is a top exploded view of a light-generation module of the lighting device of FIG. 1.
Figure 4:
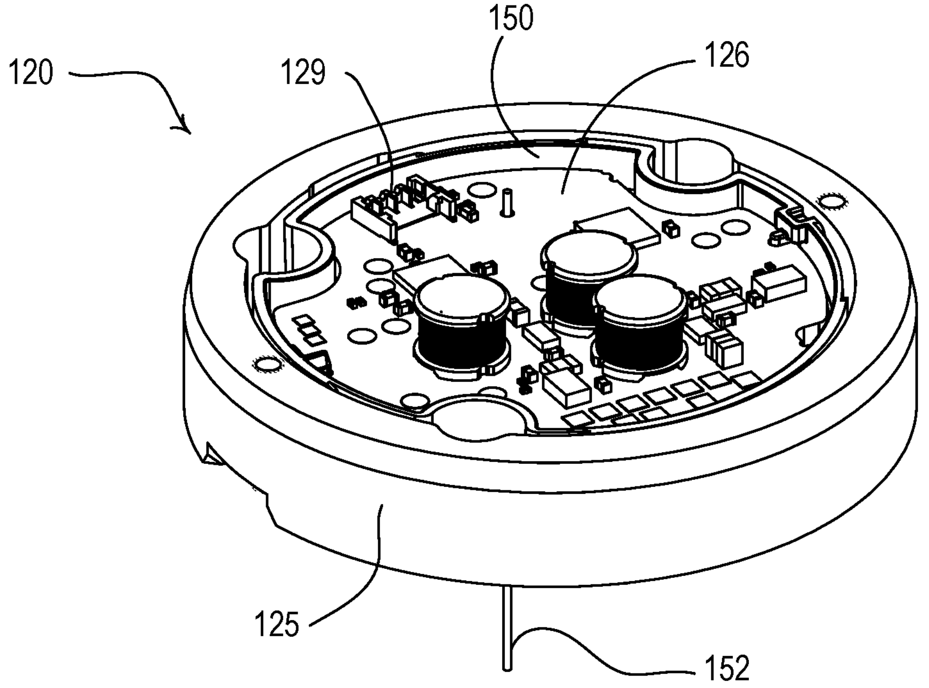
FIG. 4 is a bottom exploded view of the light-generation module of FIG. 4.

FIG. 3 is a top exploded view and FIG. 4 is a bottom exploded view of the light-generation module 120. The emitters 122 may be arranged on (e.g., mounted to) the emitter PCB 124. The light-generation module 120 may also comprise a control PCB 126 on which electrical circuitry may be mounted (e.g., as will be described in greater detail with reference to FIGS. 6 and 7). The module heat sink 125 of the light-generation module 120 may be captured (e.g., sandwiched) between the emitter PCB 124 and the control PCB 126. The emitter PCB 124 and the control PCB 126 may each have a circularly-shaped periphery. The control PCB 126 may be electrically isolated from the module heat sink 125 via an insulator 150. The control PCB 126 may be electrically connected to the emitter PCB 124 through pins (not shown) that are electrically connected to the control PCB 126 and extend through the module heat sink 125 to a connector 128 on the emitter PCB 124. The pins may be electrically isolated from the module heat sink 125 (e.g., via the insulator 150).

The electrical circuitry mounted on the control PCB 126 may include one or more drive circuits for controlling the amount of power delivered to the emitters 122 of the emitter PCB 124, one or more control circuits for controlling the drive circuits, and one or more wireless communication circuits for communicating wireless signal (e.g., radio-frequency (RF) signals) with external devices. For example, each emitter circuit may be electrically coupled to a drive circuit, and the drive circuit may be configured to control all the emitters 122 of the emitter circuit in unison. As such, each of the emitter circuits may be individually controlled by the drive circuit and/or a control circuit of the lighting device 100. The emitters 122 may be controlled to adjust an intensity (e.g., lighting intensity and/or brightness) and/or a color (e.g., color temperature) of a cumulative light output of the lighting device 100. The control PCB 126 may comprise a bus connector 129 configured to be attached to the bus connector 144 of the power converter circuit 140 on the power PCB 142. The control PCB 126 may be arranged in a plane that is parallel to a plane of the emitter PCB 124.

The light-generation module 120 may comprise an antenna 152 electrically connected to at least one of the wireless communication circuits mounted to the control PCB 126. For example, the antenna 152 may comprise a plated wire. The antenna 152 may be configured to extend from the control PCB 126 through the module heat sink 125, for example, through a bore 154 in the insulator 150 (e.g., to isolate the antenna 152 from the module heat sink 125. The antenna 152 may extend into an optical cavity (e.g., a recess of the upper dome 112) of the lighting device 100.

Figure 5:
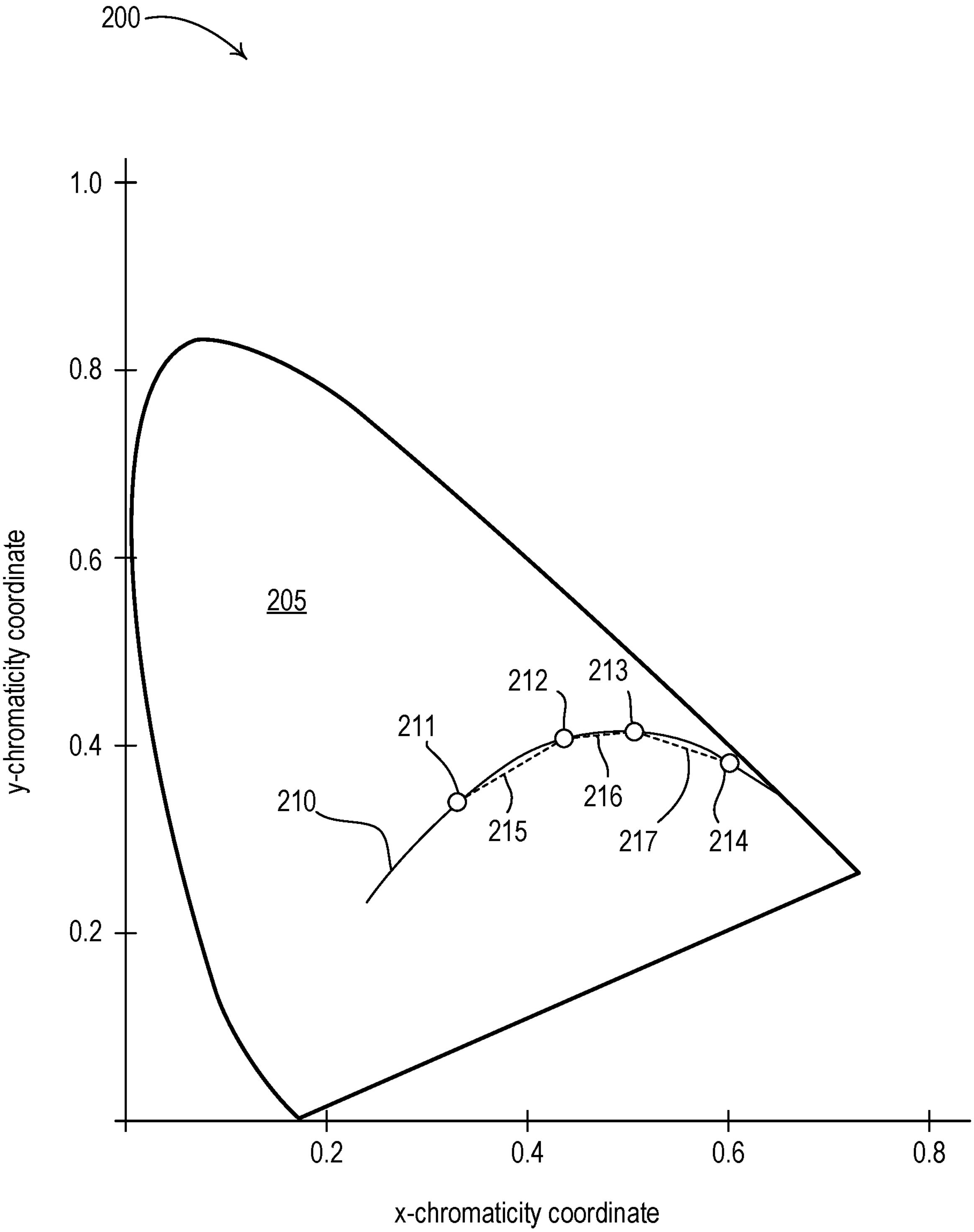
FIG. 5 depicts an International Commission on Illumination (CIE) 1931 color space chart depicting a color space and a black body locus.

FIG. 5 depicts an International Commission on Illumination (CIE) 1931 color space chart 200 depicting a color space 205 and a black body locus 210. The color space 205 may represent a two-dimensional space (e.g., an XY chromaticity space) where colors may be indicated by an x-chromaticity coordinate and a y-chromaticity coordinate. The black body locus 210 may represent a one-dimensional space (e.g., a CCT chromaticity space) where colors may be indicated by a color temperature value (e.g., from 1400 K to 10,000 K). The chart 200 depicts example color adjustments between colors on the black body locus 210 and between colors on and off the black body locus 210. A color within a predetermined threshold value of the black body locus 210 may be considered to be on the black body locus 210. A color farther from the black body locus 210 than the predetermined threshold value may be considered to be off the black body locus 210. The predetermined threshold may be determined such that it is within one MacAdam ellipse of the black body locus 210. The predetermined threshold value may be a delta UV (Duv) value (e.g., a delta UV value of 0.05). The predetermined threshold value may be a function of illuminance. For example, as an illuminance value (e.g., of a lighting device) decreases, the predetermined threshold value may increase.

A lighting device (e.g., such as the lighting device 100 shown in FIG. 1) may be controlled to emit light at a plurality of color temperatures 211, 212, 213, 214 (e.g., four color temperatures) on the black body locus 210. The lighting device may comprise separate emitter circuits (e.g., one or more of the emitters 122, sometimes referred to as a string of the emitters 122) configured to emit light at the color temperatures 211, 212, 213, 214 (e.g., four color temperatures) on the black body locus 210. For example, the first color temperature 211 may be approximately 5700 K, the second color temperature 212 may be approximately 3000 K, the third color temperature 213 may be approximately 2200 K, and the fourth color temperature 214 may be approximately 1800 K. For example, each emitter may be configured to emit light at nominal or rated color temperature. For instance, each emitter may be rated or have a nominal color temperature as defined by, for example, ANSI C78.377-2011.

The lighting device may turn on each of the emitter circuits individually to control the color temperature of the light emitted by the lighting device to each of the respective color temperatures 211, 212, 213, 214. The lighting device may also be configured to turn two of the emitter circuits on at once. For example, the lighting device may turn on two adjacent emitter circuits to adjust the color temperature of the light emitted by the lighting device to color temperatures between the color temperatures 211, 212, 213, 214. The lighting device may be configured to individually adjust the intensities of the two adjacent emitter circuits to adjust the color temperature of the light emitted by the lighting device along segments 215, 216, 217 between the adjacent color temperatures 211, 212, 213, 214. For example, the lighting device may be configured to adjust the intensities of the two adjacent emitter circuits at the color temperatures 211, 212 to adjust the color temperature of the light emitted by the lighting device along the segment 215. The lighting device may be configured to adjust the intensities of the two adjacent emitter circuits at the color temperatures 212, 213 to adjust the color temperature of the light emitted by the lighting device along the segment 216. The lighting device may be configured to adjust the intensities of the two adjacent emitter circuits at the color temperatures 213, 214 to adjust the color temperature of the light emitted by the lighting device along the segment 217.

The segments 215, 216, 217 may represent a piece-wise path along which the lighting device may control the color temperature of the light emitted by the lighting device. Although described with reference to segments of color temperatures, the lighting device may be configured to adjust the color or other characteristic of the light emitted by the lighting device across a path or a plurality of piece-wise segments (e.g., piece-wise color segments, piece-wise color temperature segments, etc.). The piece-wise segments may be the same sizes (e.g., ranges) as one another or different sizes (e.g., as illustrated) from one another. For example, the range of the color temperatures of the segment 215 may be greater than the range of color temperatures of the segment 216. Further, although illustrated as three segments of color temperatures, the lighting device may be configured to adjust the color temperature of the light emitted by the lighting device along two or more segments of color temperatures (e.g., based on the number of emitter circuits included in the lighting device). Finally, it should be appreciated that the segments (e.g., the segments of color temperature) may be non-overlapping segments, in some examples.

The lighting device may be configured to adjust the color temperature of the light emitted by the lighting device (e.g., linearly) between the color temperatures of two adjacent emitter circuits. Adjacent emitter circuits may be emitter circuits that are closest to one another in color temperature (e.g., along the black body locus 210) in comparison to the respective color temperatures of the other emitter circuits of the lighting device. For example, the emitter circuit configured to emit light at the color temperature 211 may be adjacent to the emitter circuit that is configured to emit light at the color temperature 212, while the emitter circuit that is configured to emit light at the color temperature 212 may be adjacent to the emitter circuit that is configured to emit light at the color temperature 211 on one side, and also adjacent to the emitter circuit that is configured to emit light at the color temperature 213 on the other side. Since all of the emitter circuits of the lighting device may be configured to emit light at a color temperature on the black body locus 210, the lighting device may be configured to control the color temperature of the light emitted by the lighting device to be on or close to the black body locus 210.

The lighting device may be configured to control the color temperature of the cumulative light emitted by the lighting device to be equal to a target color temperature $T_{TRGT}$. The target color temperature $T_{TRGT}$ may be one of a plurality of predefined color temperatures along the segment of color temperatures defined by (e.g., between) two emitter circuits. In some examples, the lighting device may control the amount of power delivered to each emitter circuit linearly across the segment of color temperatures. For instance, the light device may control the color temperature of the cumulative light according to multiple steps along the segment, where the steps may be equal distance apart from one another along the segment. However, in other examples, the steps between the color temperatures along the segment may differ along the segment.

The lighting device (e.g., a control circuit of the lighting device) may determine how to mix (e.g., the mix may include a lumen value for each emitter circuit) the light emitted by each of the two emitter circuits (e.g., LEDs) to cause the color temperature of the cumulative light emitted by the lighting device to be equal to the target color temperature $T_{TRGT}$. For example, the lighting device may be configured to weigh the amount of power delivered each emitter circuit to generate the target color temperature $T_{TRGT}$ to, for example, weigh the mixing of the color temperatures of each emitter and cause color temperature of the cumulative light emitted by the lighting device to be equal to the target color temperature $T_{TRGT}$. For instance, the lighting device may control the magnitudes of respective drive currents conducted through the emitter circuits to specific magnitudes based on, for example, the target color temperature $T_{TRGT}$, the target intensity $L_{TRGT}$, and/or the specific color temperatures of each emitter circuit. For example, the lighting device may determine the magnitude of the drive currents based on the lumen values needed from each emitter circuit to generate the target color temperature $T_{TRGT}$. The lighting device may use a table (e.g., stored in memory) and/or one or more equations to determine the lumen values and/or the magnitude of the drive currents necessary to cause the color temperature of the cumulative light emitted by the lighting device to be equal to the target color temperature $T_{TRGT}$.

Further, in some examples, the lighting device may be configured to perform warm dimming using the plurality of emitter circuits. The lighting device may be configured to adjust the color temperature of the light emitted by the lighting device as a function of intensity. For instance, the lighting device may be configured to control a present intensity $L_{PRES}$ of the light emitted by the lighting device towards a target intensity $L_{TRGT}$, which may range across a dimming range, e.g., between a low-end intensity $L_{LE}$ (e.g., a minimum intensity, such as approximately 0.1%-1.0%) and a high-end intensity $L_{HE}$ (e.g., a maximum intensity, such as approximately 100%), and may be configured to adjust a present color temperature $T_{PRES}$ of the cumulative light emitted by the lighting device towards a target color temperature $T_{TRGT}$, which may range between a cool-white color temperature $T_{CW}$ (e.g., approximately 3100-6000 K) and a warm-white color temperature $T_{WW}$ (e.g., approximately 2000-3000 K). Further, the lighting device may be configured to control the target color temperature $T_{TRGT}$ as a function of the target intensity $L_{TRGT}$. For example, the lighting device may increase the target color temperature $T_{TRGT}$ as the target intensity $L_{TRGT}$ is increased, and decrease the target color temperature $T_{TRGT}$ as the target intensity $L_{TRGT}$ is decreased (e.g., between approximately 5000 K at 80% intensity and approximately 2200 K at 10% intensity). Accordingly, the lighting device may control two emitter circuits to control the light emitted by the lighting device along an intensity range that is associated with the color temperatures between the two emitter circuits, for example, to provide warm dimming. Alternatively or additionally, the lighting device may be configured to adjust the intensity of the light emitted by the lighting device as a function of color temperature.

Figure 6:
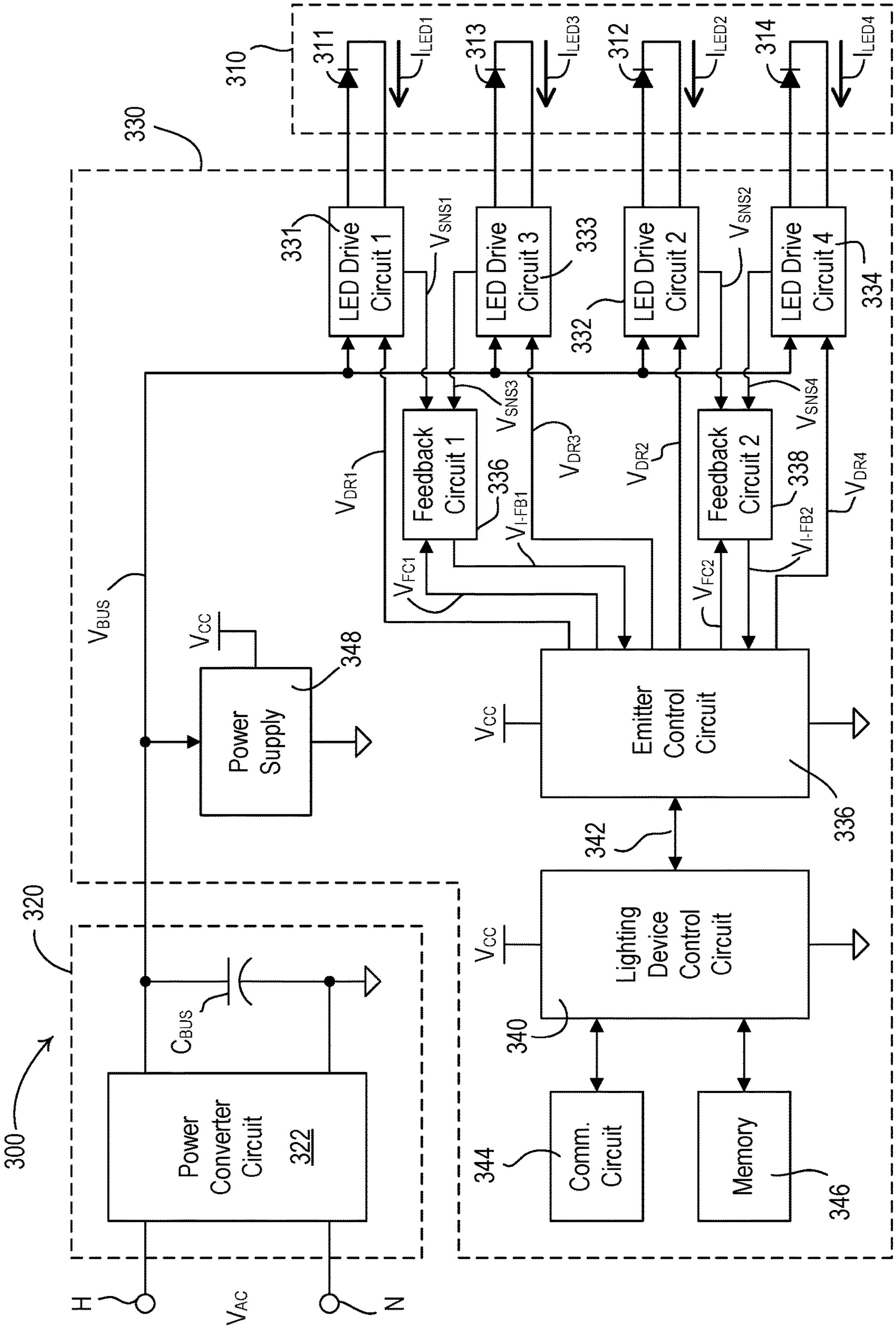
FIG. 6 is a simplified block diagram of an example controllable lighting device, such as the lighting device of FIG. 1.

FIG. 6 is a simplified block diagram of an example controllable electrical device, such as a controllable lighting device 300 (e.g., the lighting device 100 shown in FIG. 1). The controllable lighting device 300 may comprise a light source 310. For example, the light source 310 of the controllable lighting device 300 may comprise one or more emitter circuits 311, 312, 313, 314 (e.g., LEDs). Each of the emitter circuits 311, 312, 313, 314 may include one or more emitters, such as the emitters 122 shown in FIG. 3. The emitters of each emitter circuit 311, 312, 313, 314 may be electrically coupled together in a series or parallel connection. As such, the emitters of each emitter circuits 311, 312, 313, 314 may be controlled in unison. The emitter circuits 311, 312, 313, 314 may be controlled to adjust an intensity (e.g., lighting intensity and/or brightness) and/or a color (e.g., color temperature) of a cumulative light output of the controllable lighting device 300.

Each of the emitter circuits 311, 312, 313, 314 is shown in FIG. 6 as a single LED, but, as noted above, may each comprise a plurality of LEDs connected in series (e.g., a string or chain of LEDs), a plurality of LEDs connected in parallel, or a suitable combination thereof, depending on the particular lighting system. The emitter circuits 311, 312, 313, 314 may comprise, for example, white phosphor-coated LEDs. The emitter circuits 311, 312, 313, 314 may each represent a string of one or more LEDs, where the LEDs in each string are all configured to emit light at the same color temperature. The strings of LEDs represented by each of the emitter circuits 311, 312, 313, 314 may be configured to emit light at different color temperatures. Further, the emitters of the light source 310 are not limited to LEDs, and in some examples, other technology, such as OLEDs.

Each of the emitter circuits 311, 312, 313, 314 may be configured to emit light at a color temperature (e.g., a different color temperature) that is along the black body locus (e.g., the black body locus 210). The emitter circuits that are configured to emit light at high color temperatures may comprise more LEDs than the emitters at lower color temperatures. For example, the first emitter circuit 311 may represent a string of LEDs (e.g., eight LEDs) at a first color temperature, the second emitter circuit 312 may represent a string of LEDs (e.g., eight LEDs) at a second color temperature, the third emitter circuit 313 may represent a string of LEDs (e.g., five LEDs) at a third color temperature, and the fourth emitter circuit 314 may represent a chain of LEDs (e.g., one LED) at a fourth color temperature. The first color temperature may be greater than the second color temperature, the second color temperature may be greater than the third color temperature, and the third color temperature may be greater than the fourth color temperature.

As an example, the first color temperature may be between 5,900 K and 5,500 K, or more preferably between 5,800 K and 5,600 K, or most preferably between 5,750 K and 5,650 K. The second color temperature may be between 3,200 K and 2,800 K, or more preferably between 3,100 K and 2,900 K, or most preferably between 3,050 K and 2,950 K. The third color temperature may be between 2,400 K and 2,000 K, or more preferably between 2,300 K and 2,100 K, or most preferably between 2,250 K and 2,150 K. The fourth color temperature may be between 2,000 K and 1,600 K, or more preferably between 1,900 K and 1,700 K, or most preferably between 1,850 K and 1,750 K. Although described in context of these color temperatures, the emitter circuits 311, 312, 313, 314 may be configured to emit light accordingly to any color temperature.

In one example, the first emitter circuit 311 may represent a string of eight LEDs at a color temperature of 5700 K (e.g., the color temperature 211), the second emitter circuit 312 may represent a string of eight LEDs at a color temperature of 3000 K (e.g., the color temperature 212), the third emitter circuit 313 may represent a string of five LEDs at a color temperature of 2200 K (e.g., the color temperature 213), and the fourth emitter circuit 314 may represent a chain of one LED at a color temperature of 1800 K (e.g., the color temperature 214). Although described as comprising four emitter circuits, the controllable lighting device 300 may be include more or less than four emitter circuits that are configured to emit light at different color temperatures, such as three emitter circuits or five, six, seven, etc. emitter circuits (e.g., and that configured with the same or a different number of LEDs). Further, as noted herein, each LED of each emitter circuit 311, 312, 313, 314 may be configured to emit light at nominal or rated color temperature, for example, as defined by ANSI C78.377-2011.

The controllable lighting device 300 may comprise a power-board circuit 320 (e.g., the power converter circuit 140). The power-board circuit 320 may be mounted to a power PCB (e.g., the power PCB 142) of the controllable lighting device 300. The power-board circuit 320 may comprise a power converter circuit 322, which may receive a source voltage, such as an AC mains line voltage $V_{AC}$, via a hot connection H and a neutral connection N (e.g., via the screw-in base 116 and/or the screw-in base 118). Although illustrated as connected to an AC power source (e.g., the AC mains line voltage $V_{AC}$), in other examples the lighting device 300 may be coupled to a direct current (DC) power source.

The power converter circuit 322 may generate a DC bus voltage $V_{BUS}$ (e.g., approximately 15-50V) across a bus capacitor $C_{BUS}$. The power converter circuit 322 may comprise, for example, a boost converter, a buck converter, a buck-boost converter, a flyback converter, a single-ended primary-inductance converter (SEPIC), a Ćuk converter, or any other suitable power converter circuit for generating an appropriate bus voltage. The power converter circuit 322 may provide electrical isolation between the AC power source and the emitter circuits 311, 312, 313, 314, and may operate as a power factor correction (PFC) circuit to adjust the power factor of the controllable lighting device 300 towards a power factor of one.

The controllable lighting device 300 may comprise a control-board circuit 330. The control-board circuit 330 may be mounted to a control PCB (e.g., the control PCB 160) of the controllable lighting device 300. The control-board circuit 330 may comprise respective LED drive circuits 331, 332, 333, 334 for controlling (e.g., individually controlling) the power delivered to and an intensity (e.g., lighting intensity and/or luminous flux) of the light emitted of each of the emitter circuits 311, 312, 313, 314 of the light source 310. Each of the LED drive circuits 331, 332, 333, 334 may receive the bus voltage $V_{BUS}$ and may adjust magnitudes of respective LED drive currents $I_{LED1}$, $I_{LED2}$, $I_{LED3}$, $I_{LED4}$ conducted through the emitter circuits 311, 312, 313, 314. Each of the LED drive circuits 331, 332, 333, 334 may comprise a regulation circuit, such as a switching regulator (e.g., a buck converter) for controlling the magnitudes of the respective LED drive currents $I_{LED1}$-$I_{LED4}$.

The control-board circuit 330 may comprise an emitter control circuit 336 for controlling the LED drive circuits 331, 332, 333, 334 to control the intensities of the emitter circuits 311, 312, 313, 314 of the light source 310. The emitter control circuit 336 may comprise, for example, a microprocessor, a microcontroller, a programmable logic device (PLD), an application specific integrated circuit (ASIC), a field-programmable gate array (FPGA), or any other suitable processing device or controller. The emitter control circuit 336 may generate one or more drive signals $V_{DR1}$, $V_{DR2}$, $V_{DR3}$, $V_{DR4}$ for controlling the respective LED drive circuits 331, 332, 333, 334. The emitter control circuit 336 may be configured to control the LED drive circuits 331, 332, 333, 334 to control the intensity and/or the color temperature of the light emitted by the controllable lighting device 300. The emitter control circuit 336 may be configured to turn on two (e.g., only two) of the emitter circuits 311, 312, 313, 314 at one time. For example, the emitter control circuit 336 may be configured to control no more than two adjacent emitter circuits 311, 312, 313, 314 at one time, where adjacent emitter circuits are emitter circuits that are closest to one another in color temperature (e.g., along the black body locus) when compared to the respective color temperatures of the other emitters of the controllable lighting device 300. For example, the emitter circuits 311 and 312 may be adjacent, the emitter circuits 312 and 313 may be adjacent, and the emitter circuits 313 and 314 may be adjacent.

The control-board circuit 330 may further comprise multiple feedback circuits 336, 338 (e.g., two feedback circuits). Each feedback circuit 336, 338 may be coupled to one or more of the LED drive circuits 331, 332, 333, 334 that are not configured to turn on the respective emitter circuits 311, 312, 313, 314 at the same time. For example, the first feedback circuit 336 may be coupled to and responsive to the first LED drive circuit 331 and third LED drive circuit 333, and the first and third LED drive circuits 331, 333 may be configured or controlled such that they do not turn on their respective emitter circuits 311, 313 at the same time. Further, and for example, the second feedback circuit 338 may be coupled to and responsive to the second LED drive circuit 332 and the fourth LED drive circuit 334, and the second and fourth LED drive circuits 332, 334 may be configured or controlled such that they do not turn on their respective emitter circuits 312, 314 at the same time.

Each feedback circuit 336, 338 may be coupled to the LED drive circuits 331, 332, 333, 334 that emit light at alternating color temperatures when compared to the respective color temperatures of the other emitter circuits of the controllable lighting device 300. For example, the first feedback circuit 336 may be coupled to and responsive to the first LED drive circuit 331 and third LED drive circuit 333, and the second feedback circuit 338 may be coupled to and responsive to the second LED drive circuit 332 and the fourth LED drive circuit 334. Each of the feedback circuits 336, 338 may be configured to be coupled to additional LED drive circuits as long as the LED drive circuits coupled to a single feedback circuit are not configured or controlled to turn on the respective emitter circuits at the same time. For example, each of the feedback circuits 336, 338 may be configured to be coupled to any number of LED drive circuits so long as the LED drive circuits are configured to control emitter circuits that emit light at alternating color temperatures on the black body locus.

Each feedback circuit 336, 338 may be configured to receive one or more sense voltages $V_{SNS1}$, $V_{SNS2}$, $V_{SNS3}$, $V_{SNS4}$ from the respective LED drive circuits 331, 332, 333, 334 to which the feedback circuit is coupled. The sense voltages $V_{SNS1}$, $V_{SNS2}$, $V_{SNS3}$, $V_{SNS4}$ may each have a magnitude that indicates the instantaneous magnitude of the LED drive current $I_{LED1}$-$I_{LED4}$ conducted by the respective LED drive circuit 331, 332, 333, 334. For example, the first feedback circuit 336 may be configured to receive the first sense voltage $V_{SNS1}$ from the first LED drive circuit 331, where the first sense voltage $V_{SNS1}$ may have a magnitude that indicates the instantaneous magnitude of the LED drive current $I_{LED1}$. Each feedback circuit 336, 338 may generate a respective load-current feedback signal $V_{I-FB1}$, $V_{I-FB2}$ that may indicate the average magnitude of the LED drive current $I_{LED1}$-$I_{LED4}$ conducted through the emitter circuits 311, 312, 313, 314 that is presently turned on. The magnitude of the feedback signals $V_{I-FB1}$, $V_{I-FB2}$ may be, for example, representative of the average magnitude of the drive current during a filter window (e.g., as described in more detail herein).

The emitter control circuit 336 may receive the feedback signal $V_{I-FB1}$, $V_{I-FB2}$ and control the LED drive circuits 331, 332, 333, 334 to adjust the average magnitudes of the LED drive currents $I_{LED1}$-$I_{LED4}$ towards respective target currents $I_{TRGT1}$-$I_{TRGT4}$ in response to the load-current feedback signals $V_{I-FB1}$, $V_{I-FB2}$. The emitter control circuit 336 may be configured to turn on the respective emitter circuits 311, 312, 313, 314 controlled by one (e.g., only one) of the LED drive circuits 331, 332, 333, 334 coupled to each of the feedback circuits 336, 338 at a time. For example, the emitter control circuit 336 may be configured to control only LED drive circuits that do not share a feedback circuit when adjusting the present intensity $L_{PRES}$ of the light emitted by the controllable lighting device 300. For instance, in some examples, the emitter control circuit 336 may be configured to never control two or more LED drive circuits that share a feedback circuit when adjusting the present intensity $L_{PRES}$ of the light emitted by the controllable lighting device 300. The emitter control circuit 336 may generate respective filter control signals $V_{FC1}$, $V_{FC2}$ for controlling the feedback circuit 336, 338, for example, to control the generation of the load-current feedback signals $V_{I-FB1}$, $V_{I-FB2}$.

The controllable lighting device 300 may comprise a lighting device control circuit 340 that may be electrically coupled to the emitter control circuit 336 via a communication bus 342 (e.g., an $I^2C$ communication bus, serial peripheral interface (SPI) communication bus, etc.). The lighting device control circuit 340 may be configured to control the emitter circuits 311, 312, 313, 314 of the light source 310 to control the intensity (e.g., lighting intensity and/or brightness) and/or the color (e.g., the color temperature) of the cumulative light emitted by the controllable lighting device 300. The lighting device control circuit 340 may comprise, for example, a microprocessor, a microcontroller, a programmable logic device (PLD), an application specific integrated circuit (ASIC), a field-programmable gate array (FPGA), or any other suitable processing device or controller. The lighting device control circuit 340 may be configured to adjust (e.g., dim) a present intensity $L_{PRES}$ (e.g., a present brightness) of the cumulative light emitted by the controllable lighting device 300 towards a target intensity $L_{TRGT}$ (e.g., a target brightness), which may range across a dimming range of the controllable lighting device, e.g., between a low-end intensity $L_{LE}$ (e.g., a minimum intensity, such as approximately 0.1%-1.0%) and a high-end intensity $L_{HE}$ (e.g., a maximum intensity, such as approximately 100%). In some examples, the present intensity $L_{PRES}$ of each emitter (e.g., LED) may be dependent upon the magnitude of the drive current across the emitter. The lighting device control circuit 340 may be configured to adjust a present color temperature $T_{PRES}$ of the cumulative light emitted by the controllable lighting device 300 towards a target color temperature $T_{TRGT}$, which may range between a cool-white color temperature (e.g., approximately 3100-6000 K) and a warm-white color temperature (e.g., approximately 2000-3000 K). In some examples, the present color temperature $T_{PRES}$ of the cumulative light emitted by the controllable lighting device 300 may be dependent upon (e.g., a function of) the magnitude of the drive current across the emitter circuit (e.g., and/or the intensity of the light emitted by the emitter circuit), and the color temperature of each emitter circuit.

The controllable lighting device 300 may comprise a communication circuit 344 coupled to the lighting device control circuit 340. The communication circuit 344 may comprise a wireless communication circuit, such as, for example, a radio-frequency (RF) transceiver coupled to an antenna for transmitting and/or receiving RF signals. The wireless communication circuit may be an RF transmitter for transmitting RF signals, an RF receiver for receiving RF signals, or an infrared (IR) transmitter and/or receiver for transmitting and/or receiving IR signals. Alternatively or additionally, the communication circuit 344 may be coupled to the hot connection H and the neutral connection N of the controllable lighting device 300 for transmitting a control signal via the electrical wiring using, for example, a power-line carrier (PLC) communication technique. The lighting device control circuit 340 may be configured to determine the target intensity $L_{TRGT}$ or the target color temperature $T_{TRGT}$ for the controllable lighting device 300 in response to messages (e.g., digital messages) received via the communication circuit 334.

The controllable lighting device 300 may comprise a memory 346 configured to store operational characteristics of the controllable lighting device 300 (e.g., the target intensity $L_{TRGT}$, the target color temperature $T_{TRGT}$, the low-end intensity $L_{LE}$, the high-end intensity $L_{HE}$, etc.). The memory may be implemented as an external integrated circuit (IC) or as an internal circuit of the lighting device control circuit 340. The controllable lighting device 300 may comprise a power supply 348 that may receive the bus voltage $V_{BUS}$ and generate a supply voltage $V_{CC}$ for powering the lighting device control circuit 340 and other low-voltage circuitry of the controllable lighting device. For example, the power supply 348 may be in the control-board circuit 330 (e.g., as shown in FIG. 6) and/or the power-board circuit 320.

The memory 346 may comprise a computer-readable storage media or machine-readable storage media that maintains computer-executable instructions for performing one or more as described herein. For example, the memory 346 may comprise computer-executable instructions or machine-readable instructions that include one or more portions of the procedures described herein. The lighting device control circuit 340 and/or the emitter control circuit 336 may access the instructions from memory 346 for being executed to cause the lighting device control circuit 340 and/or the emitter control circuit 336 to operate as described herein, or to operate one or more other devices as described herein. The memory 346 may comprise computer-executable instructions for executing configuration software. The computer-executable instructions may be executed to perform the procedure 800 as described herein. Further, the memory 346 may have stored thereon one or more settings and/or control parameters associated with the controllable lighting device 300.

Figure 7A:
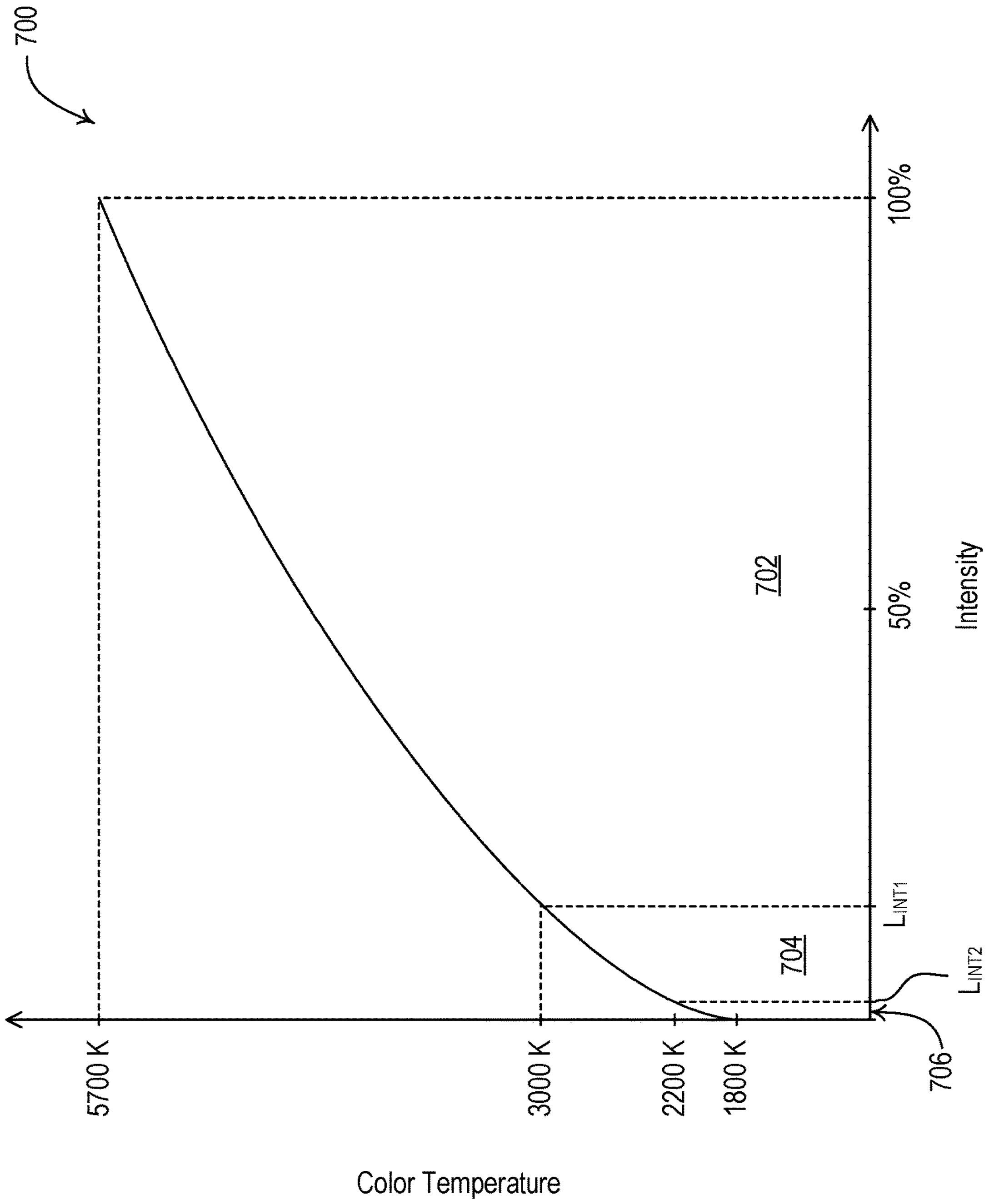
FIG. 7A depicts an example of a first dimming curve for a lighting device that indicates color temperature and intensity across the dimming range.
Figure 7B:
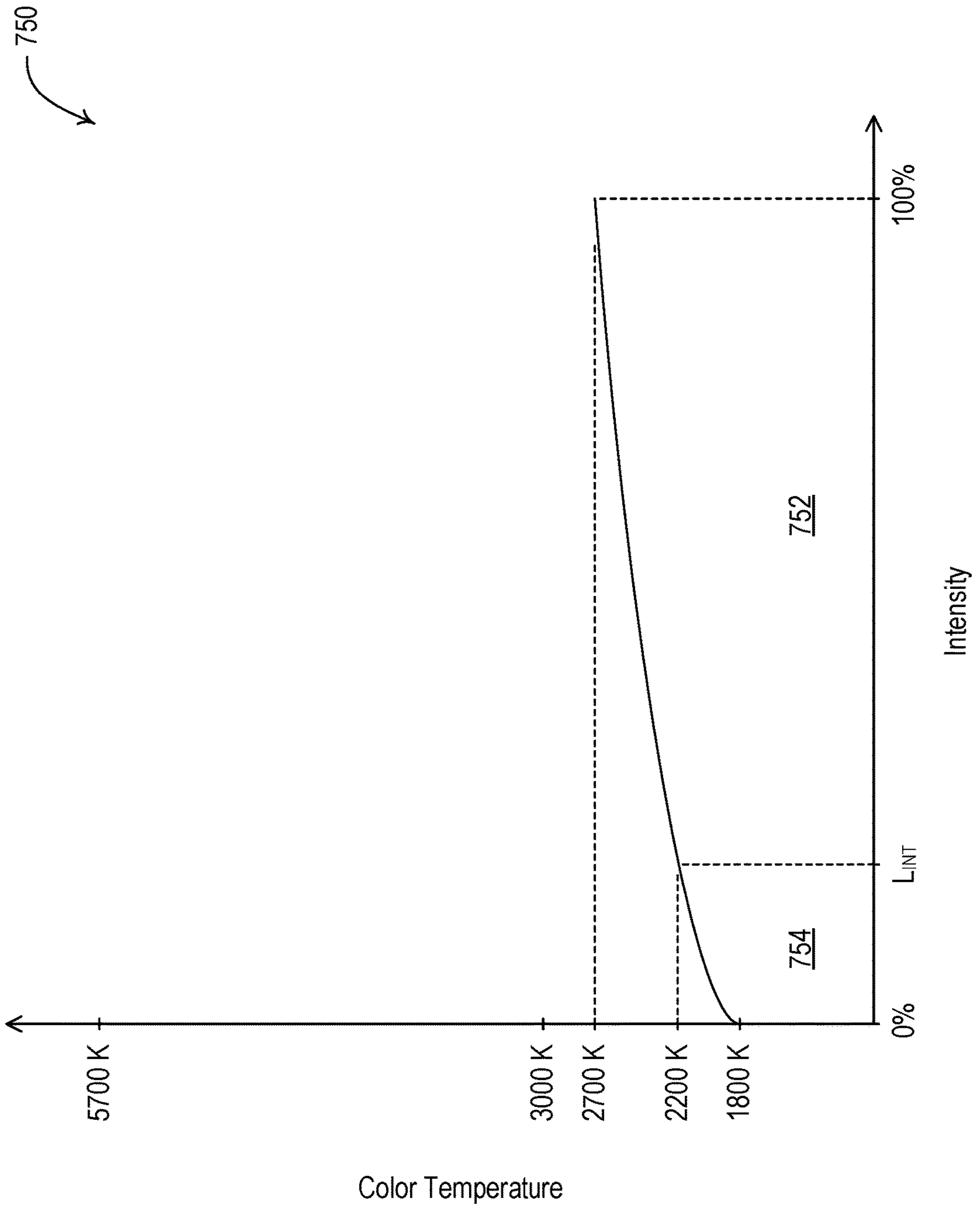
FIG. 7B depicts an example of a second dimming curve for a lighting device that indicates color temperature and intensity across the dimming range.

The controllable lighting device 300 may be configured with one or more user selectable dimming curves. When configured with a dimming curve, the lighting device control circuit 340 may be configured to use all or a subset of the emitter circuits of the controllable lighting device 300 to adjust the present intensity $L_{PRES}$ across a dimming range of the controllable lighting device 300 between the low-end intensity $L_{LE}$ (e.g., a minimum intensity, such as approximately 0.1%-1.0%) and the high-end intensity $L_{HE}$ (e.g., a maximum intensity, such as approximately 100%). FIG. 7A depicts an example of a first dimming curve 700 for a lighting device, such as the controllable lighting device 300, that indicates color temperature and intensity. FIG. 7B depicts an example of a second dimming curve 750 for a lighting device, such as the controllable lighting device 300, that indicates color temperature and intensity. As noted, in some examples, the controllable lighting device 300 may include four emitter circuits 311, 312, 313, 314. Further, in examples, the first emitter circuit 311 may be configured to emit light at 5700 K, the second emitter circuit 312 may be configured to emit light at 3000 K, the third emitter circuit 313 may be configured to emit light at 2200 K, and the fourth emitter circuit 314 may be configured to emit light at 1800 K.

The lighting device control circuit 340 may be configured to control an amount of power delivered one or more emitter circuits (e.g., different sets of two emitter circuits) to control the light emitted by the light source 310 across a plurality of non-overlapping intensity ranges between the low-end intensity $L_{LE}$ and the high-end intensity $L_{HE}$ according to a configured dimming curve. As illustrated in the example dimming curve 700 of FIG. 7A, the lighting device control circuit 340 may be configured to control the amount of power delivered to the first and second emitter circuits 311, 312 to control the light emitted by the light source 310 along a first intensity range 702 between a first intermediate intensity $L_{INT1}$ (e.g., approximately 15%) and the high-end intensity $L_{HE}$ (e.g., 100%). The light device control circuit 340 may also be configured to control the amount of power delivered to the second and third emitter circuits 312, 313 to control the light emitted by the light source 310 along a second intensity range 704 between a second intermediate intensity $L_{INT2}$ (e.g., approximately 3%) and the first intermediate intensity $L_{INT1}$. The lighting device control circuit 340 may further be configured to control an amount of power delivered to the third and fourth emitter circuits 313, 314 to control the light emitted by the light source 310 along a third intensity range 706 between the low-end intensity $L_{LE}$ (e.g., approximately 0.1%) and the second intermediate intensity $L_{MIN2}$. As shown in FIG. 7A, the first, second, and third intensity ranges 702, 704, 706 do not overlap. At the junction between the intensity ranges 702, 704, 706, the lighting device control circuit 340 may control the amount of power delivered to a single emitter (e.g., to a maximum power level) to control the light emitted by the light source 310 to the intensity level that resides at the junction between two of the intensity ranges (e.g., at the first intermediate intensity $L_{MIN1}$ and at the second intermediate intensity $L_{MIN2}$).

Further, the dimming curves may include any number of intensity ranges between the low-end intensity $L_{LE}$ and the high-end intensity $L_{HE}$ (e.g., between approximately 0.1% to 100% intensity). For example, the dimming curve may include two intensity ranges, such as in the example dimming curve 750 of FIG. 7B. As illustrated in the example dimming curve 750 of FIG. 7B, the lighting device control circuit 340 may be configured to control an amount of power delivered to the second and third emitter circuits 312, 313 to control the light emitted by the light source 310 along a first intensity range 752 between an intermediate intensity LINT (e.g., approximately 20%) and the high-end intensity $L_{HE}$, and control an amount of power delivered to the third and fourth emitter circuits 313, 314 to control the light emitted by the light source 310 along a second intensity range 754 (e.g., between the low-end intensity $L_{LE}$ and the intermediate intensity $L_{MIN}$). In this example, the lighting device control circuit 340 may be configured to adjust the intensity of the light emitted by the light source 310 across the entire dimming range without using the first emitter circuit 311 (e.g., which may be configured to emit light at 5700 K). The controllable lighting device 300 may be configured to control a number of emitter circuits that is one more (e.g., only one more) than the number of intensity ranges in the configured dimming curve.

Figure 7C:
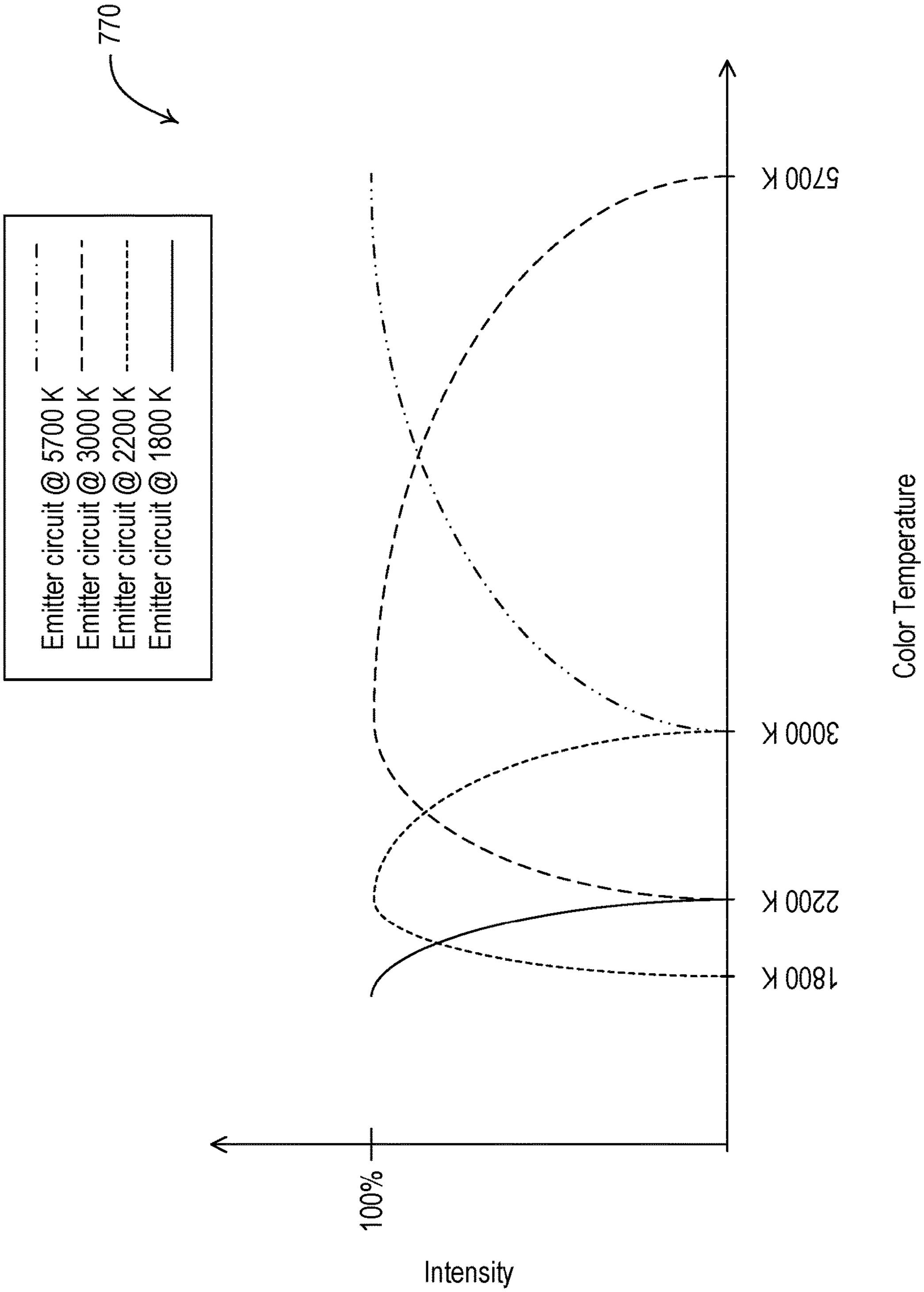
FIG. 7C depicts an example plot of a relationship between the intensity of various emitters of a lighting device and the color temperature emitted by the lighting device.

FIG. 7C depicts an example plot of a relationship 770 between the intensity of various emitters of a lighting device, such as the controllable lighting device 300, and the color temperature emitted by the lighting device. As noted herein, in some examples, the controllable lighting device 300 may include four emitter circuits 311, 312, 313, 314, and in some examples, the first emitter circuit 311 may be configured to emit light at 5700 K, the second emitter circuit 312 may be configured to emit light at 3000 K, the third emitter circuit 313 may be configured to emit light at 2200 K, and the fourth emitter circuit 314 may be configured to emit light at 1800 K. In such examples, the lighting device control circuit 340 may be configured to adjust a present color temperature $T_{PRES}$ of the cumulative light emitted by the light source 310 towards a target color temperature $T_{TRGT}$, which may range between a cool-white color temperature (e.g., approximately 3100-6000 K) and a warm-white color temperature (e.g., approximately 2000-3000 K). For any given target color temperature $T_{TRGT}$, the lighting device control circuit 340 may be configured to control the amount of power delivered to (e.g., the magnitude of the respective drive current conducted through) two emitter circuits (e.g., only two of the emitter circuits) to control the present color temperature $T_{PRES}$ of the cumulative light emitted by the light source 310 towards the target color temperature $T_{TRGT}$.

The relationship 770 of FIG. 7C illustrates the relative intensity levels of each emitter circuit (e.g., the first emitter circuit 311 at 5700 K, the second emitter circuit 312 at 3000 K, the third emitter circuit 313 at 2200 K, and the fourth emitter circuit 314 at 1800 K) for any given target color temperature $T_{TRGT}$. For example, if the target color temperature $T_{TRGT}$ is set to 2300 K, the lighting device 300 may control the amount of power delivered to (e.g., the magnitude of the respective drive current conducted through) the second emitter circuit 312 (e.g., configured to emit light at 3000 K) and the third emitter circuit 313 (e.g., configured to emit light at 2200 K) to control the present color temperature $T_{PRES}$ to 2300 K. Further, in such an example, the lighting device control circuit 340 may be configured to control the third emitter circuit 313 to an intensity that is greater than the intensity to which the second emitter circuit 312 is controlled, for example, as shown by the relationship 770 of FIG. 7C. Although illustrated as including four emitter circuits and emitters circuits that are configured to emit light at 5700 K, 3000 K, 2200 K, and 1800 K, respectively, the lighting device 300 is not so limited, and may include more or less emitter circuits and/or emitter circuits that are configured to emit light at different color temperatures. Depending on the specific color temperatures of the emitter circuits of the lighting device 300, the relationship between the relative intensity levels of each emitter circuit for any given target color temperature $T_{TRGT}$ may differ from that shown in the example of FIG. 7C.

Figure 8:
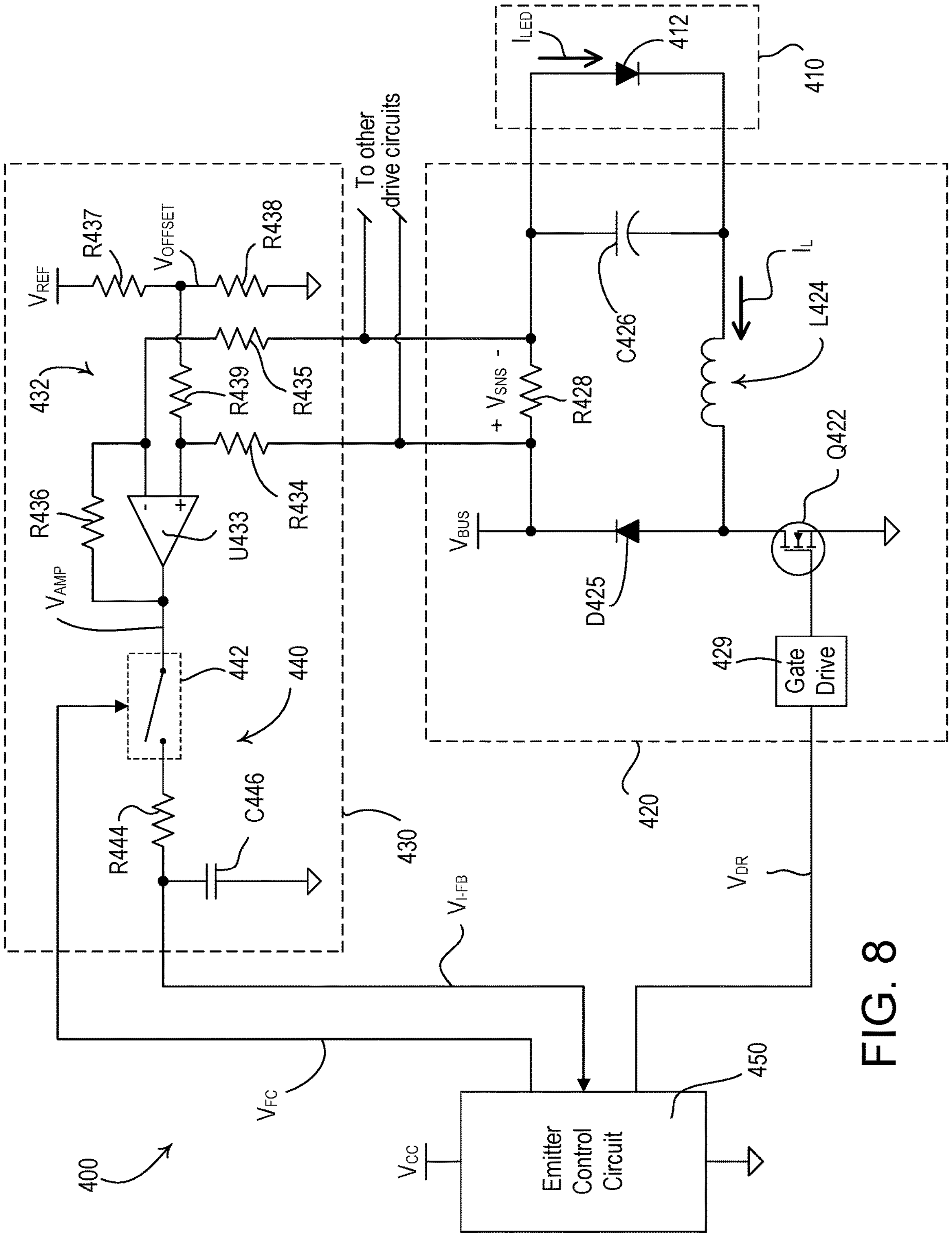
FIG. 8 is a simplified schematic diagram of a load regulation circuit and a feedback circuit of an example lighting device, such as the lighting device of FIG. 1.
Figure 9:
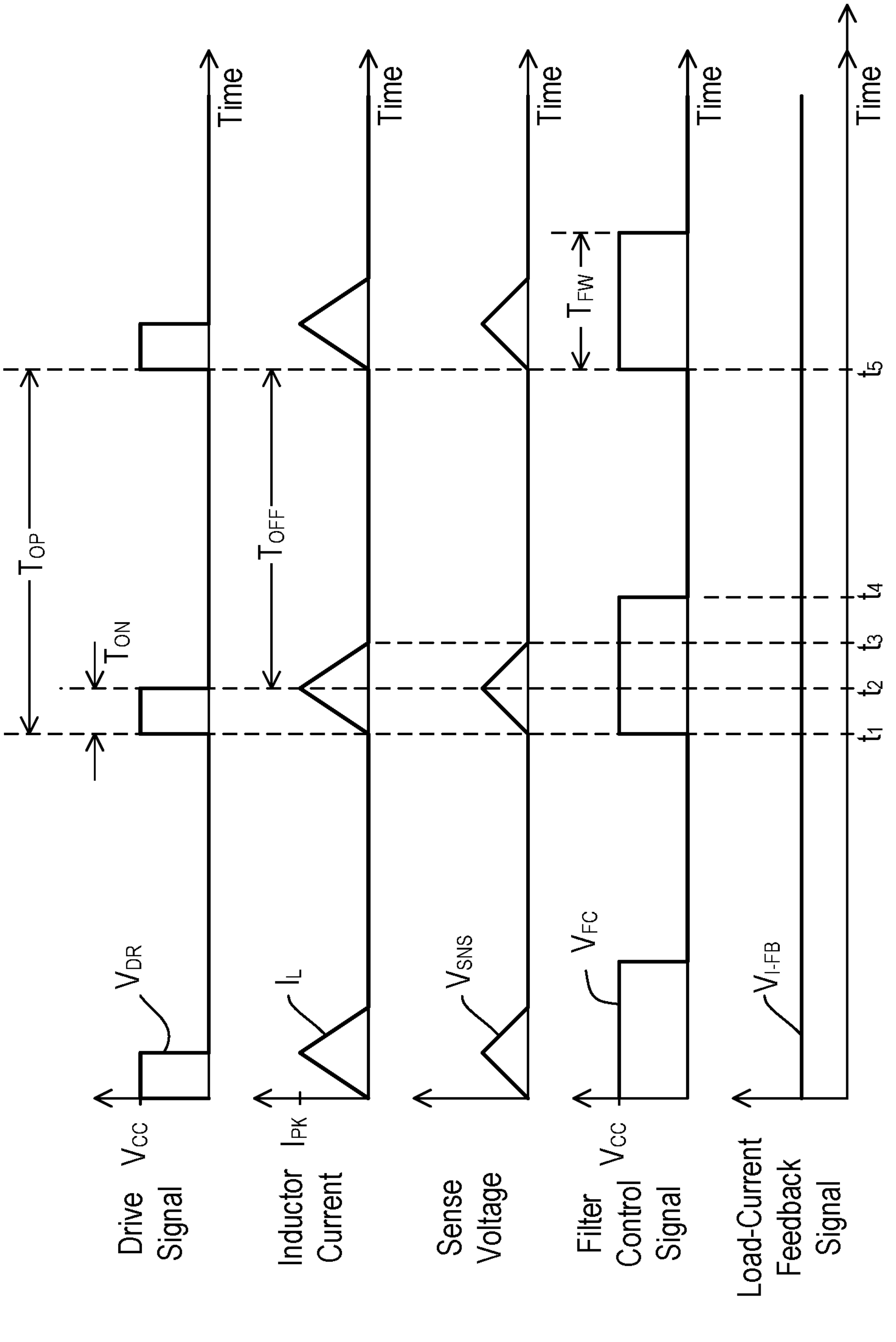
FIG. 9 shows example waveforms illustrating the operation of the lighting device of FIG. 8.

FIG. 8 is a schematic diagram of a portion of an example lighting device 400 (e.g., the controllable lighting device 300 shown in FIG. 6). FIG. 9 shows example waveforms illustrating the operation of the lighting device 400 shown in FIG. 8. The controllable lighting device 400 may comprise a light source 410 having an emitter circuit 412, which may be one of the emitter circuits 311, 312, 313, 314 of the light source 310 shown in FIG. 6. While the emitter circuit 412 is shown in FIG. 8 as a single LED, the emitter circuit 412 may comprise a plurality of LEDs connected in series (e.g., a chain of LEDs), a plurality of LEDs connected in parallel, or a suitable combination thereof, depending on the particular lighting system. Additionally or alternatively, the emitter circuit 412 may comprise one or more organic light-emitting diodes (OLEDs).

The lighting device 400 may comprise a load regulation circuit, e.g., an LED drive circuit 420 (e.g., one of the LED drive circuits 331, 332, 333, 334), a feedback circuit 430 (e.g., one of the feedback circuits 336, 338), and a control circuit 450 (e.g., the emitter control circuit 336). The LED drive circuit 420 may receive a bus voltage $V_{BUS}$ (e.g., the bus voltage $V_{BUS}$ generated by the power converter circuit 322) and control the amount of power delivered to the emitter circuit 412 so as to control the intensity of the LED light source. To control the amount of power delivered to the emitter circuit 412, the LED drive circuit 420 may be configured to control an average magnitude $I_{AVE}$ of a load current, e.g., an LED drive current $I_{LED}$, conducted through the emitter circuit 412.

As shown in FIG. 8, the LED drive circuit 420 may comprise a buck converter. The LED drive circuit 420 may comprise a switching transistor, e.g., a field-effect transistor (FET) Q422, which may be controlled to adjust the average magnitude $I_{AVE}$ of the LED drive current $I_{LED}$ conducted through the emitter circuit 412. The LED drive circuit 420 may also comprise an inductor L424, a switching diode D425, an output capacitor C426, and a sense resistor R428. The drive signal $V_{DR}$ may be coupled to a gate of the FET Q422 through a gate drive circuit 429. Since the source of the FET Q422 is coupled to circuit common, the FET Q422 may be a small signal component. When the FET Q422 is conductive, the inductor L424 may conduct an inductor current $I_L$ through the FET Q422 and the parallel combination of the output capacitor C236 and the emitter circuit 412. When the FET Q422 is non-conductive, the inductor L424 may conduct the inductor current $I_L$ through the switching diode D425 and the parallel combination of the output capacitor C426, and the emitter circuit 412. The emitter circuit 412 may conduct an average component of the inductor current $I_L$ and the output capacitor C426 may conduct a transient component of the inductor current $I_L$. The average magnitude $I_{AVE}$ of the LED drive current $I_{LED}$ may be approximately equal to an average magnitude of the inductor current $I_L$.

The control circuit 450 may be configured to generate a drive signal $V_{DR}$ for controlling the FET Q422 of the LED drive circuit 420 to adjust the average magnitude $I_{AVE}$ of the LED drive current $I_{LED}$. The control circuit 450 may be configured to control the drive signal $V_{DR}$ to render the FET Q422 conductive for an on time $T_{ON}$ to cause the magnitude of the inductor current $I_L$ to increase while the FET Q422 is conductive (e.g., as shown between times t and $t_2$ in FIG. 9). The magnitude of the inductor current $I_L$ may then decrease to zero amps (e.g., as shown between times $t_2$ and $t_3$ in FIG. 9). The control circuit 450 may control the LED drive circuit 420 in a discontinuous conduction mode, such that the inductor current $I_L$ is a series of pulses and the magnitude of the inductor current $I_L$ remains at zero amps for at least a minimum delay period. The control circuit 450 may be configured to control the drive signal $V_{DR}$ to render the FET Q422 non-conductive for an off time $T_{OFF}$ (e.g., after the on time $T_{ON}$) to ensure that the magnitude of the inductor current $I_L$ remains at zero amps for at least a minimum delay period. The control circuit 450 may be configured to control the FET Q422 to be conductive and non-conductive for the on time $T_{ON}$ and the off time $T_{OFF}$, respectively, on a periodic basis, e.g., at an operating period $T_{OP}$ (e.g., between times $t_1$ and $t_5$ in FIG. 9). The control circuit 450 may be configured to adjust the average magnitude $I_{AVE}$ of the LED drive current $I_{LED}$ by adjusting at least one of the on time $T_{ON}$ and/or the operating period $T_{OP}$ of the drive signal $V_{DR}$. A sense voltage $V_{SNS}$ (e.g., a sense signal, such as one of the sense voltages $V_{SNS1}$, $V_{SNS2}$, $V_{SNS3}$, $V_{SNS4}$) may be generated across the sense resistor R428 of the LED drive circuit 420 and may be proportional to the instantaneous magnitude of the inductor current $I_L$ (e.g., as shown in FIG. 9).

The feedback circuit 430 may comprise an amplifier circuit 432 that may have an operational amplifier U433 and may be configured as a non-inverting amplifier circuit. The operational amplifier U433 may receive the sense voltage $V_{SNS}$ across a positive (e.g., non-inverting) input and a negative (e.g., inverting) input through respective resistors R434, R435. The amplifier circuit 432 may also comprise a resistor R436 coupled between the negative input and an output of the operational amplifier U433. The amplifier circuit 432 may also comprise a resistive divider circuit having resistors R437, R438, which may receive a reference voltage $V_{REF}$ and generate an offset voltage $V_{OFFSET}$ at a junction of the resistors R437, R438. For example, the resistors R437, R438 may have equal resistances and the reference voltage $V_{REF}$ may be approximately 600 mV, such that the offset voltage $V_{OFFSET}$ is approximately 300 mV. The reference voltage $V_{REF}$ may be generated, for example, by a power supply of the lighting device 400 (e.g., the power supply 348 of the controllable lighting device 300). Alternatively or additionally, the feedback circuit 430 may comprise a power supply (e.g., a shunt regulator circuit) for generating the reference voltage $V_{REF}$. The offset voltage $V_{OFFSET}$ may be coupled to the positive input of the operational amplifier U433 via a resistor R439 for adding a DC offset (e.g., equal to the magnitude of the offset voltage) to the sense voltage $V_{SNS}$. The amplifier circuit 430 may be configured to generate an amplified signal $V_{AMP}$, which may be an amplified version of the sense signal $V_{SNS}$ plus the offset voltage $V_{OFFSET}$.

In some examples (e.g., as shown in FIG. 8), each LED drive circuit 420 of the lighting device 400 may comprise a respective sense resistor, such as the sense resistor R428. However, in other examples (e.g., as described herein), multiple LED drive circuits 420 that are coupled to the same feedback circuit 430 may share a single sense resistor. In examples where each LED drive circuit 420 comprises its own sense resistor that generates a sense voltage $V_{SNS}$, the feedback circuit 430 may be configured to receive a respective sense voltage $V_{SNS}$ for each LED drive circuit 420 coupled to the feedback circuit 430. In such instances, the feedback circuit 430 may be configured to receive the sense voltage $V_{SNS}$ from the sense resistor R428 of each LED drive circuit 420 connected to the feedback circuit 430, and the feedback circuit 420 may be configured to determine which sense voltage $V_{SNS}$ to be responsive to based on which LED drive circuit 420 is turned on (e.g., based on the emitters presently being controlled, the target color temperature $T_{TRGT}$, the segment of color temperatures, etc.). Further, in some examples, the sense resistors R428 connected to the single feedback circuit 430 may be, for example, connected in parallel with one another. Also, in some examples (e.g., the example shown in FIG. 8), there may not be any connections between the LED drive circuits 420 that are connected to the feedback circuit 430 when each LED drive circuit 420 comprises its own sense resistor R428.

Alternatively, in some examples, the lighting device 400 may include multiple LED drive circuits (e.g., multiple LED drive circuits 420) connected to a single feedback circuit 430, and the multiple LED drive circuits 420 may share a single sense resistor (e.g., the sense resistor R428). Stated another way, each feedback circuit 430 may be coupled to a single sense resistor R428 and receive a single sense voltage $V_{SNS}$ (e.g., as opposed to receiving multiple, unique sense voltages $V_{SNS}$ (e.g., $V_{SNS1}$ and $V_{SNS3}$ or $V_{SNS2}$ and $V_{SNS4}$)). In some examples, one LED drive circuit 420 connected to the feedback circuit 430 may include the sense resistor R428, while additional LED drive circuits 420 that are also connected to the feedback circuit 430 may comprise a connection to the sense resistor R428 that resides within the other LED drive circuit 420. Alternatively, the feedback circuit 430 may include the sense resistor R428 instead of one the drive circuit 420. Regardless of the configuration, the sense resistor R428 may be coupled to more than one LED drive circuit 420 (e.g., the multiple LED drive circuits 420 that are coupled to the feedback circuit 430), such that the sense resistor R428 is shared by two or more LED drive circuits 420. Further, as noted herein, the feedback circuit 430 may be coupled to a plurality of the LED drive circuits (e.g., the LED drive circuit 420 and another LED drive circuit) that are configured such that the LED drive circuits do not turn on their respective emitter circuits at the same time. Accordingly, the feedback circuit 430 may be configured to receive a single sense voltage $V_{SNS}$ (e.g., a sense signal) that is proportional to the instantaneous magnitude of the current conducted through the LED drive circuit 420 that is turned on (e.g., emitting light). As such, the feedback circuit 430 may be configured to receive the sense voltage $V_{SNS}$ from a single feedback resistor R428 that is shared by the multiple LED drive circuits 420, and determine the instantaneous magnitude of the current conducted through the LED drive circuit 420 that is presently turned on (e.g., as opposed to receiving multiple, unique sense voltages $V_{SNS}$, one for each sense resistor R428 coupled to the feedback circuit 430). Reducing the number of sense resistors R428 in the lighting device 400 may help, for example, reduce board congestion, reduce the numbers of parts, and/or reduce overall product size.

The feedback circuit 430 may also comprise a filter circuit 440 that may filter the amplified signal $V_{AMP}$ to generate a load-current feedback signal $V_{I-FB}$, which may indicate the average magnitude of the inductor current $I_L$ and thus the average magnitude $I_{AVE}$ of the LED drive current $I_{LED}$. The filter circuit 440 may comprise a controllable switching circuit 442 and a filter circuit (e.g., a low-pass filter circuit) that includes a resistor R444 and capacitors C446. The control circuit 450 may generate a filter control signal $V_{FC}$ for rendering the controllable switching circuit 442 conductive and non-conductive. When the controllable switching circuit 442 is conductive, the filter circuit 440 may be configured to filter the amplified signal $V_{AMP}$ to generate the load-current feedback signal $V_{I-FB}$. When the controllable switching circuit 442 is non-conductive, the capacitor C446 of the filter circuit 440 may maintain the magnitude of the load-current feedback signal $V_{I-FB}$ at a value that indicates the average magnitude $I_{AVE}$ of the LED drive current $I_{LED}$ during the period of time when the controllable switching circuit 442 was previously conductive.

Since the control circuit 450 is generating the drive signal $V_{DR}$, which causes the generation of the pulses of the inductor current $I_L$, the control circuit 450 may generate the filter control signal $V_{FC}$ to render the controllable switch 442 conductive and non-conductive in coordination with the drive signal $V_{DR}$. For example, the control circuit 450 may drive the filter control signal $V_{FC}$ high (e.g., towards the supply voltage $V_{CC}$) to render the controllable switch 442 conductive at approximately the same time as driving the drive signal $V_{DR}$ high to render the FET Q422 conductive. The control circuit 450 may maintain the filter control signal $V_{FC}$ high for a filter window time period $T_{FW}$ (e.g., between times $t_1$ and $t_4$ as shown in FIG. 9), which may be at least as long as the length of each pulse of the inductor current $I_L$ (e.g., at least as long as the length of each pulse of the LED drive current $I_{LED}$). At the end of the filter window time period $T_{FW}$, the control circuit 450 may drive the filter control signal $V_{FC}$ low (e.g., towards zero volts) to render the controllable switch 442 non-conductive. The capacitor C446 may charge when the controllable switch 442 is conductive and may maintain the magnitude of the load-current feedback signal $V_{I-FB}$ substantially constant when the controllable switch 442 is non-conductive. As a result, the magnitude of the load-current feedback signal $V_{I-FB}$ may indicate an average magnitude $I_{WIN}$ of the LED drive current $I_{LED}$ during (e.g., only during) the filter window when the filter control signal $V_{FC}$ is high.

The control circuit 450 may be configured to sample the magnitude of the load-current feedback signal $V_{I-FB}$, for example, using an analog-to-digital converter (ADC). For example, the control circuit 450 may be configured to sample the magnitude of the load-current feedback signal $V_{I-FB}$ after the filter window time period $T_{FW}$ (e.g., immediately following the filter window time period $T_{FW}$). The sampled magnitude may be equal to the average magnitude $I_{WIN}$ of the LED drive current $I_{LED}$ during the filter window. The control circuit 450 may be configured to subtract a correction factor CF from the sampled magnitude, where the correction factor CF represents an offset in the magnitude of the load-current feedback signal $V_{I-FB}$ that is due to the offset voltage $V_{OFFSET}$, which is added to the sense voltage $V_{SNS}$ received by the amplifier circuit 432. The control circuit 450 may be configured to determine correction factor CF using a calibration procedure (e.g., as will be explained in greater detail below). The control circuit 450 may be configured to calculate the average magnitude $I_{AVE}$ of the LED drive current $I_{LED}$ based on the average magnitude $I_{WIN}$ of the LED drive current $I_{LED}$ during the filter window and a present duty cycle $DC_{SW}$ of the filter control signal $V_{FC}$, e.g., $I_{AVE}=DC_{SW}\cdot(I_{WIN}-CF)$.

The control circuit 450 may be configured to execute the calibration procedure to determine the correction factor CF. For example, the control circuit 450 may be configured to determine the correction factor CF by rendering the controllable switching circuit 442 conductive when the emitter circuit 412 is turned off (e.g., when the magnitude of the LED drive current $I_{LED}$ is zero amps), and measure the magnitude of the load-current feedback signal $V_{I-FB}$. The control circuit 450 is configured to store the measured magnitude of the load-current feedback signal $V_{I-FB}$ in memory (e.g., the memory 346) as the correction factor CF. The control circuit 450 may be configured to execute the calibration procedure to determine the correction factor CF each time that the lighting device 400 is coupled to AC power source (e.g., when powered on).

Figure 10A:
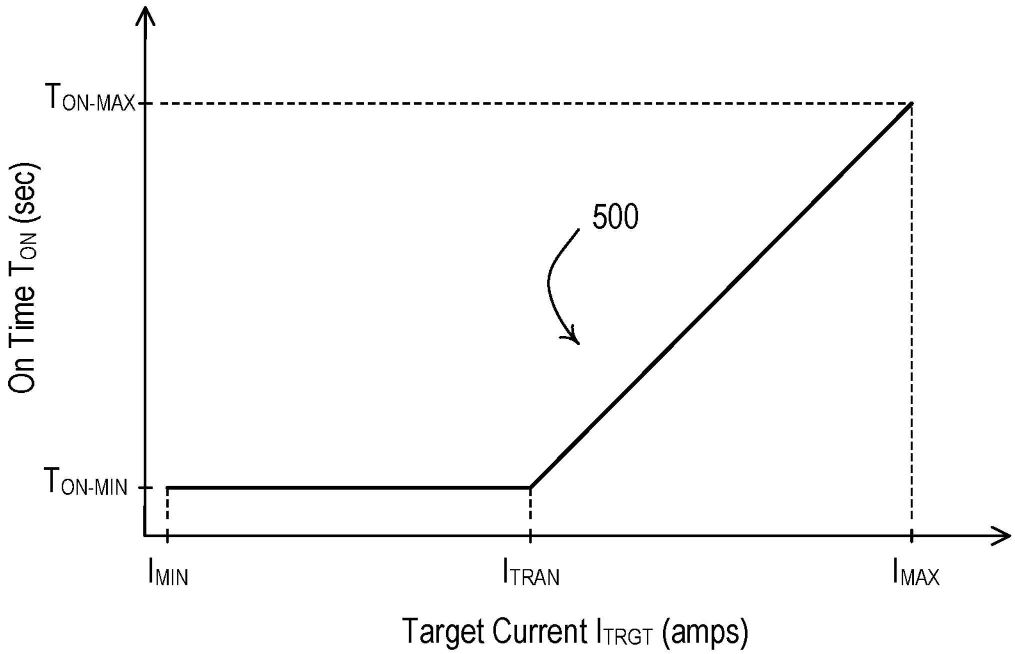
FIG. 10A is an example plot of a relationship between an on time of a drive signal and a target current in a lighting device, such as the lighting device of FIG. 8.
Figure 10B:
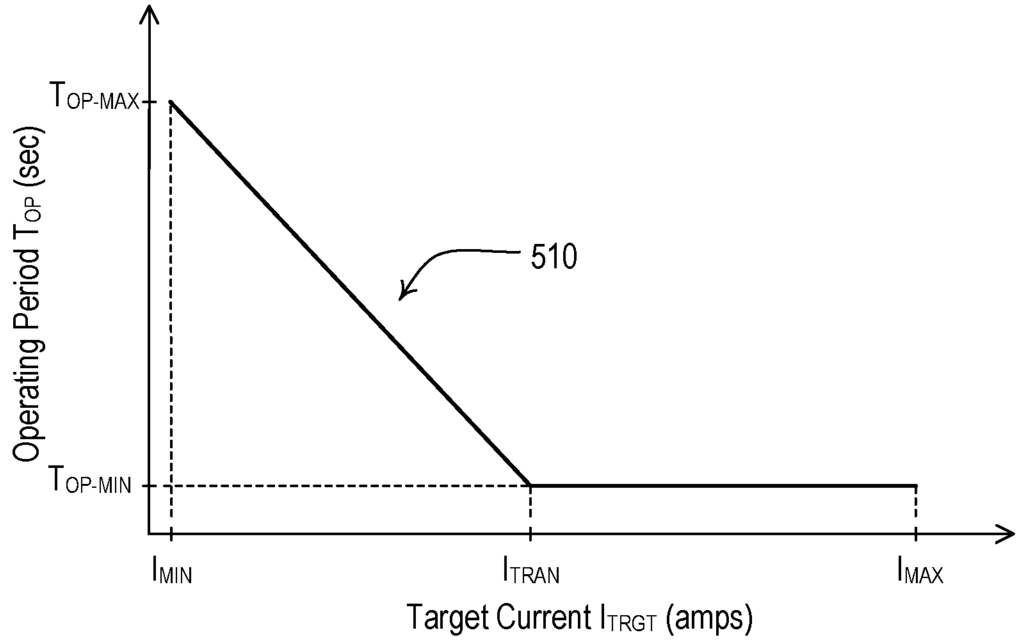
FIG. 10B is an example plot of a relationship between an operating period of a drive signal and a target current in a lighting device, such as the lighting device of FIG. 8.

The control circuit 450 may be configured to adjust the average magnitude $I_{AVE}$ of the LED drive current $I_{LED}$ towards a target current $I_{TRGT}$ (e.g., by adjusting at least one of the on time $T_{ON}$ and/or the operating period $T_{OP}$ of the drive signal $V_{DR}$) in response to the load-current feedback signal $V_{I-FB}$. FIG. 10A is an example plot of a relationship 500 between the on time $T_{ON}$ of the drive signal $V_{DR}$ and the target current $I_{TRGT}$. FIG. 10B is an example plot of a relationship 510 between the operating period $T_{OP}$ of the drive signal $V_{DR}$ and the target current $I_{TRG}$. For example, the target current $I_{TRGT}$ may range between a maximum current $I_{MAX}$ (e.g., at a maximum intensity) and a minimum current IMIN (e.g., at a minimum intensity). When the target current $I_{TRGT}$ is greater than (e.g., greater than or equal to) a transition current $I_{TRAN}$, the control circuit 450 may maintain the operating period $T_{OP}$ of the drive signal $V_{DR}$ constant at a minimum operating period $T_{OP-MIN}$ and adjust the on time $T_{ON}$ of the drive signal $V_{DR}$ between a minimum on time $T_{ON-MIN}$ and a maximum on time $T_{ON-MAX}$ to adjust the average magnitude $I_{AVE}$ of the LED drive current $I_{LED}$. When the target current is less than the transition current $I_{TRAN}$, the control circuit 450 may maintain the on time $T_{ON}$ constant at the minimum on time $T_{ON-MIN}$ and adjust the operating period between the minimum operation period $T_{OP-MIN}$ and a maximum operating period $T_{OP-MAX}$.

Figure 11:
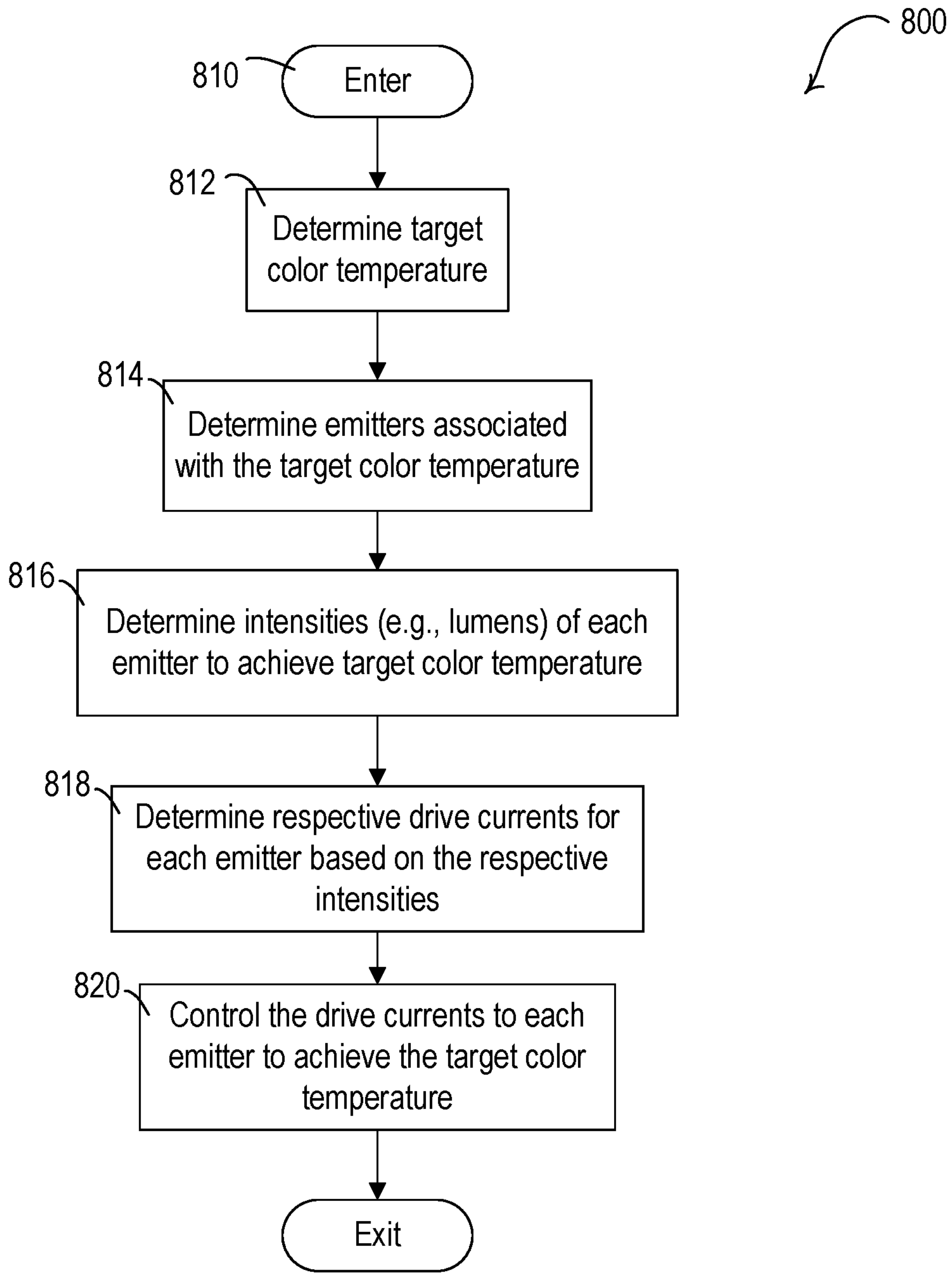
FIG. 11 is a flowchart of an example procedure for controlling a plurality of drive circuits of a lighting device to adjust the color temperature of the cumulative light emitted by a light source of the lighting device to a target color temperature.

FIG. 11 is a flowchart of an example procedure 800 for controlling a plurality of drive circuits of a lighting device (e.g., the lighting device 100 shown in FIG. 1 and/or the controllable lighting device 300 shown in FIG. 6) to adjust the color temperature of the cumulative light emitted by a light source of the lighting device to a target color temperature $T_{TRGT}$. The procedure 800 may be executed by a control circuit of the lighting device, for example, the lighting device control circuit 340 and/or the emitter control circuit 336 of the lighting device 300. The procedure 800 may be used to control the light emitted by the light source along a predefined path, such as a predefined color path (e.g., predefined color temperature path) like the black body locus. The control circuit may execute the procedure 800 periodically and/or in response to a command to control (e.g., adjust) the color temperature and/or a command to control (e.g., adjust) the intensity of the light emitted by a light source. Further, although the procedure 800 is described in context of color temperatures, the procedure 800 may be used to change a different characteristic of the light emitted by the lighting device.

The control circuit may start the control procedure 800 at 810. At 812, the control circuit may determine a target color temperature $T_{TRGT}$. The control circuit may receive a command that indicates the target color temperature $T_{TRGT}$. Alternatively or additionally, the control circuit may receive a command that indicates the target intensity $L_{TRGT}$ and determine the target color temperature $T_{TRGT}$ from the target intensity $L_{TRGT}$. For example, the lighting device may be configured to perform warm dimming using a plurality of emitter circuits. The lighting device may be configured to adjust the color temperature of the light emitted by the lighting device as a function of intensity. For instance, the lighting device may be configured to control a present intensity $L_{PRES}$ of the light emitted by the lighting device towards a target intensity $L_{TRGT}$, which may range across a dimming range, e.g., between a low-end intensity $L_{LE}$ (e.g., a minimum intensity, such as approximately 0.1%-1.0%) and a high-end intensity $L_{HE}$ (e.g., a maximum intensity, such as approximately 100%), and may be configured to adjust a present color temperature $T_{PRES}$ of the cumulative light emitted by the lighting device towards a target color temperature $T_{TRGT}$, which may range between a cool-white color temperature $T_{CW}$ (e.g., approximately 3100-6000 K) and a warm-white color temperature $T_{WW}$ (e.g., approximately 2000-3000 K).

At 814, the control circuit may determine which emitters of the lighting device are associated with the target color temperature $T_{TRGT}$. The lighting device may include a plurality of emitter circuits (e.g., three or more emitter circuits) where each emitter circuit is configured to emit light at a different color or color temperature. Taking color temperature as an example, the lighting device may comprise a first emitter circuit is configured to emit light at a first color temperature, a second emitter circuit is configured to emit light at a second color temperature, and a third emitter circuit is configured to emit light at a third color temperature, where the first, second, and third color temperatures are on a predefined path, such as the black body locus (e.g., the black body locus defined within an International Commission on Illumination (CIE) 1931 color space). For instance, the control circuit may be configured to control an amount of power delivered to the first and second emitter circuits (e.g., only to the first and second emitter circuits) to control the light emitted by the light source along a first segment of color temperatures between the first and second color temperatures, and control an amount of power delivered to second and third emitter circuits (e.g., only to the second and third emitter circuits) to control the light emitted by the light source along a second segment of color temperatures between the second and third color temperatures. In such examples, the control circuit may be configured to determine whether the target color temperature $T_{TRGT}$ resides within the range of color temperatures defined by the first segment or the second segment. Based on which segment the target color temperature $T_{TRGT}$ resides, the control circuit may determine which emitter circuits are associated with the target color temperature $T_{TRGT}$.

At 816, the control circuit may be configured to determine the intensity (e.g., lumens of each emitter to achieve the target color temperature $T_{TRGT}$. For example, the control circuit may determine how to mix the light emitted by each of the two emitter circuits (e.g., LEDs) to cause the color temperature of the cumulative light emitted by the lighting device to be equal to the target color temperature $T_{TRGT}$. The mix may, for example, include a lumen value for each emitter circuit. In some examples, the control circuit may weigh the amount of power delivered each emitter circuit to generate the target color temperature $T_{TRGT}$ to, for example, weigh the mixing of the color temperatures of each emitter and cause color temperature of the cumulative light emitted by the lighting device to be equal to the target color temperature $T_{TRGT}$.

At 818, the control circuit may be configured to determine the respective drive currents for each emitter based on the respective intensities. For example, the control circuit may determine the magnitude of the drive currents based on the lumen values needed from each emitter circuit to generate the target color temperature $T_{TRGT}$. Further, in some examples, the control circuit may determine the magnitudes of respective drive currents conducted through the emitter circuits to specific magnitudes based on, for example, the target color temperature $T_{TRGT}$, the target intensity $L_{TRGT}$, and/or the specific color temperatures of each emitter circuit. The lighting device may use a table (e.g., stored in memory) and/or one or more equations to determine the lumen values and/or the magnitude of the drive currents necessary to cause the color temperature of the cumulative light emitted by the lighting device to be equal to the target color temperature $T_{TRGT}$.

The lighting device may include a plurality of drive circuits that are configured to control the amount of power delivered to the plurality of emitters circuits, for example, as described herein. Further, in some examples, the control circuit may be configured to receive the feedback signals (e.g., the feedback signals $V_{I-FB1}$, $V_{I-FB2}$) from the plurality of drive circuits (e.g., via one or more feedback circuits), and may be configured to determine the drive circuits provided to the emitter circuits that are associated with the target color temperature $T_{TRGT}$ to adjust the average magnitudes of the drive currents towards respective target currents in response to the feedback signals. In some examples, multiple drive circuits may share a single feedback circuit, and in such instances, the control circuit may be configured to control only those drive circuits that do not share a feedback circuit when adjusting the present intensity $L_{PRES}$ of the light emitted by the controllable lighting device 300. Further, the control circuit may be configured to determine whether to apply the feedback signal from a single feedback circuit to a particular drive circuit and/or emitter circuit connected to the feedback circuit based on, for example, the target color temperature $T_{TRGT}$.

At 820, the control circuit may be configured to control an amount of power delivered to the emitter circuits that are associated with the target color temperature $T_{TRGT}$ (e.g., only to the two emitter circuits associated with the target color temperature $T_{TRGT}$) to control the light emitted by the light source to be at the target color temperature $T_{TRGT}$, and the procedure 800 may exit. The control circuit may be configured to control the amount of power delivered to (e.g., the magnitude of the respective drive current conducted through) two emitter circuits (e.g., only two of the emitter circuits that are associated with the target color temperature $T_{TRGT}$) to control a present color temperature $T_{PRES}$ of the cumulative light emitted by the light source of the lighting device towards the target color temperature $T_{TRGT}$. For instance, and using the example from above, the control circuit may be configured to control an amount of power delivered to the first and second emitter circuits to turn on the first and second emitter circuits while keeping the third emitter circuit off to control the light emitted by the light source between the first and second color temperatures and along the first segment (e.g., when the target color temperature $T_{TRGT}$ is between the first and second color temperatures), and may be configured to control an amount of power delivered to the second and third emitter circuits to turn on the second and third emitter circuits while keeping the first emitter circuit off to control the light emitted by the light source between the second and third color temperatures and along the second segment (e.g., when the target color temperature $T_{TRGT}$ is between the second and third color temperatures).

Further, it should be appreciated that in some examples, such as warm dimming, in addition to controlling the present color temperature $T_{PRES}$ of the cumulative light emitted by the light source towards the target color temperature $T_{TRGT}$, the control circuit may also be configured to control a present intensity $L_{PRES}$ of the light emitted by the lighting device towards a target intensity $L_{TRGT}$. The target intensity $L_{TRGT}$ may range across a dimming range, e.g., between a low-end intensity $L_{LE}$ (e.g., a minimum intensity, such as approximately 0.1%-1.0%) and a high-end intensity $L_{HE}$ (e.g., a maximum intensity, such as approximately 100%). After controlling the present color temperature $T_{PRES}$ of the cumulative light emitted by the light source towards the target color temperature $T_{TRGT}$ (e.g., and in some examples, in addition to controlling a present intensity $L_{PRES}$ of the light emitted by the lighting device towards a target intensity $L_{TRGT}$), the control circuit may exit the procedure 800.

What is claimed is:

1. A lighting device comprising:

a light source that comprises a plurality of emitter circuits that are configured to emit light, wherein a first emitter circuit is configured to emit light at a first color temperature, a second emitter circuit is configured to emit light at a second color temperature, and a third emitter circuit is configured to emit light at a third color temperature, wherein the first, second, and third color temperatures are different colors on a color path;

a plurality of drive circuits configured to control the amount of power delivered to the plurality of emitters circuits; and a control circuit configured to control the plurality of drive circuits to adjust a present intensity of the light emitted by the light source across a dimming range;

wherein the control circuit is configured to control an amount of power delivered to the first and second emitter circuits to turn on the first and second emitter circuits while keeping the third emitter circuit off to control the light emitted by the light source between the first and second color temperatures, and control an amount of power delivered to the second and third emitter circuits to turn on the second and third emitter circuits while keeping the first emitter circuit off to control the light emitted by the light source between the second and third color temperatures.

2. The lighting device of claim 1, wherein the first, second, and third colors are on different color temperatures on a predefined color temperature path.

3. The lighting device of claim 2, wherein the predefined color temperature path is a black body locus.

4. The lighting device of claim 3, wherein each emitter circuit comprises one or more light-emitting diodes (LEDs), wherein each LED of each emitter circuit is configured to output light at the same color temperature.

5. The lighting device of claim 4, wherein the first emitter circuit comprises an equal or greater number of LEDs than the second emitter circuit, and the second emitter circuit comprises a greater number of LEDs than the third emitter circuit.

6. The lighting device of claim 4, wherein the plurality of emitter circuits further comprises a fourth emitter circuit that is configured to emit light at a fourth color temperature that is on the black body locus.

7. The lighting device of claim 6, wherein the first emitter circuit is configured to emit light at a color temperature between 5,900 K and 5,500 K;

wherein the second emitter circuit is configured to emit light at a color temperature between 3,200 K and 2,800 K;

wherein the third emitter circuit is configured to emit light at a color temperature between 2,400 K and 2,000 K; and wherein the fourth emitter circuit is configured to emit light at a color temperature between 2,000 K and 1,600 K.

8. The lighting device of claim 7, wherein the first emitter circuit comprises eight LEDs, the second emitter circuit comprises eight LEDs, the third emitter circuit comprises five LEDs, and the fourth emitter circuit comprises one LED.

9. The lighting device of claim 6, wherein the first emitter circuit comprises eight LEDs, the second emitter circuit comprises eight LEDs, the third emitter circuit comprises five LEDs, and the fourth emitter circuit comprises one LED.

10. The lighting device of claim 3, wherein the black body locus is defined within an International Commission on Illumination (CIE) 1931 color space.

11. The lighting device of claim 10, wherein a color that is within one MacAdam ellipse of the black body locus is on the black body locus.

12. The lighting device of claim 3, wherein the second color temperature resides between the first color temperature and the third color temperature along the black body locus.

13. The lighting device of claim 1, wherein each emitter circuit comprises one or more white phosphor-coated LEDs.

14. The lighting device of claim 1, wherein the control circuit is configured to control an amount of current delivered to the plurality of emitter circuits to control the light emitted by the light source.

15. The lighting device of claim 1, wherein each emitter circuit comprises one or more light-emitting diodes (LEDs) connected in a series electrical connection, and wherein each LED of each emitter circuit is configured to output light at the same color temperature.

16. The lighting device of claim 1, wherein each emitter circuit comprises one or more emitters connected in a parallel electrical connection, and wherein each emitter of each emitter circuit is configured to output light at the same color temperature.

17. The lighting device of claim 1, wherein each emitter circuit comprises one or more emitters that are mounted to a printed circuit board (PCB) and configured to be controlled by a drive circuit of the plurality of drive circuits in unison.

18. The lighting device of claim 17, wherein the emitters comprise light-emitting diodes (LEDs).

19. The lighting device of claim 1, further comprising:

a wireless communication circuit configured to communicate wireless control signals;

wherein the control circuit is configured to receive a target intensity or a target color temperature, and control the plurality of drive circuits to adjust the present intensity or color of the light emitted by the light source toward to the target intensity or target color.

20. The lighting device of claim 19, further comprising:

an antenna electrically coupled to the wireless communication circuit.

21. The lighting device of claim 1, further comprising:

a power converter circuit configured to receive a source voltage and generate a direct-current (DC) bus voltage.

22. The lighting device of claim 1, further comprising:

a transparent or translucent dome, wherein the emitters are configured to shine light through the dome.

23. The lighting device of claim 1, further comprising:

a reflector configured to reflect light emitted by the emitter towards the lens.

24. The lighting device of claim 1, further comprising:

a screw-in base configured to be screwed into a standard Edison socket for electrically coupling the lighting device to a power source.

* * * * *